(12) United States Patent
Norimine et al.

(10) Patent No.: US 12,719,126 B2
(45) Date of Patent: Aug. 25, 2026

(54) ELECTRICITY STORAGE MODULE COMPRISING A PLURALITY OF POWER STORAGE DEVICES WITH HOLDERS AND FILM OUTER COVERING BODIES

(71) Applicant: Panasonic Intellectual Property Management Co., Ltd., Osaka (JP)

(72) Inventors: Shota Norimine, Osaka (JP); Hirotaka Ogino, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 700 days.

(21) Appl. No.: 18/249,558

(22) PCT Filed: Oct. 21, 2021

(86) PCT No.: PCT/JP2021/038857
§ 371 (c)(1),
(2) Date: Apr. 19, 2023

(87) PCT Pub. No.: WO2022/091920
PCT Pub. Date: May 5, 2022

(65) Prior Publication Data

US 2023/0395921 A1 Dec. 7, 2023

(30) Foreign Application Priority Data

Oct. 30, 2020 (JP) ................................ 2020-182504

(51) Int. Cl.
*H01M 50/244* (2021.01)
*H01M 50/213* (2021.01)
(Continued)

(52) U.S. Cl.
CPC ....... *H01M 50/244* (2021.01); *H01M 50/213* (2021.01); *H01M 50/271* (2021.01); *H01M 50/507* (2021.01)

(58) Field of Classification Search
CPC .................................................. H01M 50/244
See application file for complete search history.

(56) References Cited

U.S. PATENT DOCUMENTS

2020/0052260 A1* 2/2020 Fees .................... H01M 50/293

FOREIGN PATENT DOCUMENTS

JP 2010108794 A * 5/2010
JP 2014-170613 9/2014

OTHER PUBLICATIONS

International Search Report of PCT application No. PCT/JP2021/038857 dated Jan. 11, 2022.

* cited by examiner

*Primary Examiner* — Barbara L Gilliam
*Assistant Examiner* — Jordan E Berresford
(74) *Attorney, Agent, or Firm* — Rimon P.C.

(57) ABSTRACT

A power storage module includes a first power storage device, a second power storage device, a first holder, a second holder, and a reinforcement member. The first power storage device and the second power storage device are arranged in an orthogonal direction. The first holder includes a first side plate. The second holder includes a second side plate. The reinforcement member includes a first reinforcement part, a second reinforcement part, and a first connection part. The first reinforcement part includes a side plate groove into which the first side plate is fitted. The second reinforcement part includes a side plate groove into which the second side plate is fitted. The first connection part connects the first reinforcement part and the second reinforcement part, and is at least temporarily slidable with respect to at least one of the first reinforcement part and the second reinforcement part.

13 Claims, 9 Drawing Sheets

(51) Int. Cl.

| | |
|---|---|
| ***H01M 50/271*** | (2021.01) |
| ***H01M 50/507*** | (2021.01) |

A
B
C
4
12
14
8
θ
14a
14b
1
2
10
16

ELECTRICITY STORAGE MODULE COMPRISING A PLURALITY OF POWER STORAGE DEVICES WITH HOLDERS AND FILM OUTER COVERING BODIES

CROSS-REFERENCE TO RELATED APPLICATIONS

This application is a U.S. national stage application of the PCT International Application No. PCT/JP2021/038857 filed on Oct. 21, 2021, which claims the benefit of foreign priority of Japanese patent application No. 2020-182504 filed on Oct. 30, 2020, the contents all of which are incorporated herein by reference.

TECHNICAL FIELD

The present disclosure relates to a power storage module.

BACKGROUND ART

In the related art, a power storage module on which a plurality of cylindrical power storage devices (for example, batteries) are mounted has been known (See, for example, PTL 1). In the power storage module disclosed in PTL 1, each power storage device has a cylindrical outer covering can, and a winding-type electrode assembly is housed in each outer covering can.

CITATION LIST

Patent Literature

PTL 1: Unexamined Japanese Patent Publication No. 2014-170613

SUMMARY OF THE INVENTION

The power storage module may be used as a power supply for a vehicle or a mobile terminal. Thus, it is desired to reduce a weight of the power storage module. As a method for reducing the weight of the power storage module, it is considered that a plurality of electrode assemblies are wrapped with a common film outer covering body while individual sealing properties are maintained. Accordingly, a power storage device including the plurality of electrode assemblies can be obtained. In this case, the outer covering can in which each electrode assembly is housed can be eliminated, so that the weight of the power storage module can be reduced. On the other hand, the power storage device having a structure in which the plurality of electrode assemblies are sealed with the film outer covering body is likely to be greatly deformed by an impact or the like due to high flexibility of the film outer covering body. Thus, it is desired to enhance a holding strength of the power storage device.

The present disclosure has been made in view of such a situation, and an object of the present disclosure is to provide a technique for enhancing the holding strength of a power storage device having a structure in which a plurality of electrode assemblies are sealed with a film outer covering body.

An aspect of the present disclosure is a power storage module. The power storage module includes a plurality of power storage devices, a plurality of holders that hold the plurality of power storage devices, and a reinforcement member for the plurality of holders. The plurality of power storage devices include a first power storage device and a second power storage device. Each of the first power storage device and the second power storage device includes a plurality of cylindrical electrode assemblies, and a film outer covering body including a plurality of containers individually enclosing the plurality of electrode assemblies and a sealing part sealing each of the containers and connecting the plurality of containers to each other, and the first power storage device and the second power storage device are arranged in an orthogonal direction orthogonal to an arrangement direction of the electrode assemblies and an axial direction of the electrode assemblies. The plurality of holders includes a first holder and a second holder. The first holder includes a first side plate extending in the arrangement direction and including a plurality of recesses into which the containers of the first power storage device are fitted. The second holder includes a second side plate extending in the arrangement direction and including a plurality of recesses into which the containers of the second power storage device are fitted. The reinforcement member includes a first reinforcement part, a second reinforcement part, and a first connection part. The first reinforcement part includes a side plate groove that extends in the arrangement direction and is aligned with the first side plate in the axial direction, and into which the first side plate is fitted on a surface facing the first side plate. The second reinforcement part has a side plate groove that extends in the arrangement direction and is aligned with the second side plate in the axial direction, and into which the second side plate is fitted on a surface facing the second side plate. The first connection part connects the first reinforcement part and the second reinforcement part, and is at least temporarily slidable with respect to at least one of the first reinforcement part and the second reinforcement part.

Any combinations of the above configuration elements, and conversions of the expressions of the present disclosure among methods, devices, systems, and the like are also effective as aspects of the present disclosure.

According to the present disclosure, the holding strength of the power storage device having the structure in which the plurality of electrode assemblies are sealed with the film outer covering body can be enhanced.

DESCRIPTION OF EMBODIMENT

Figure 1:
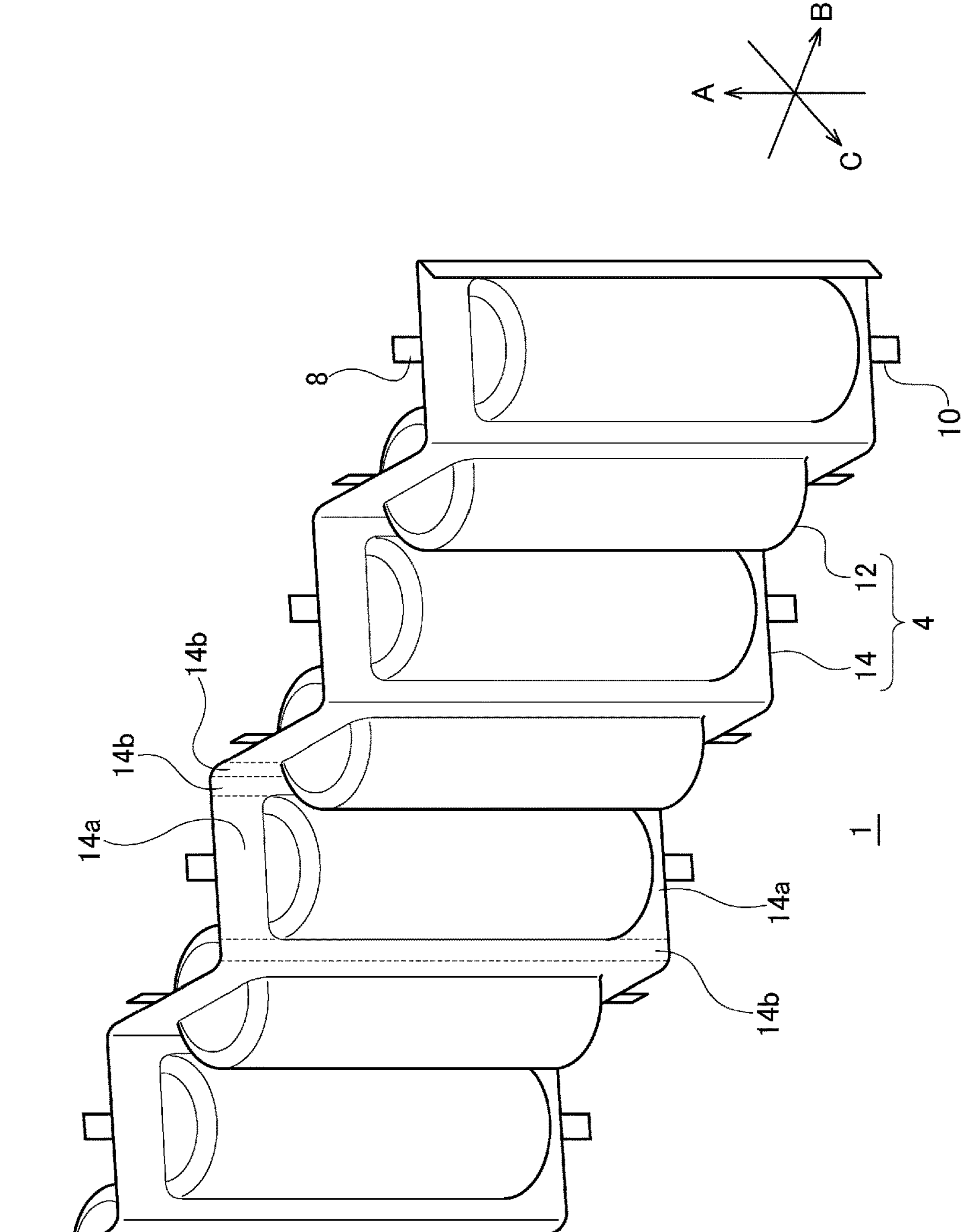
FIG. 1 is a perspective view of a power storage device provided in a power storage module according to an exemplary embodiment.

Hereinafter, the present disclosure will be described on the basis of preferred exemplary embodiment with reference to the drawings. The exemplary embodiment is not intended to limit the present disclosure but are illustrative, and all features described in the exemplary embodiment and combinations of the features are not necessarily essential to the present disclosure. The identical or equivalent constituent elements, members, and treatments illustrated in the drawings are denoted by the identical reference marks, and repetitious description will be omitted when appropriate. Furthermore, the scale and the shape of each part illustrated in each drawing are set for the sake of convenience in order to facilitate the understanding of the description and should not be interpreted in a limited manner unless otherwise specified. Furthermore, in cases where terms such as “first” and “second” are used in the present description or claims, these terms do not represent any order or importance but are intended to distinguish one configuration from another configuration, unless otherwise specified. Furthermore, from each of the drawings, a part of members not important for describing the exemplary embodiment is omitted.

Figures 2A, 2B:
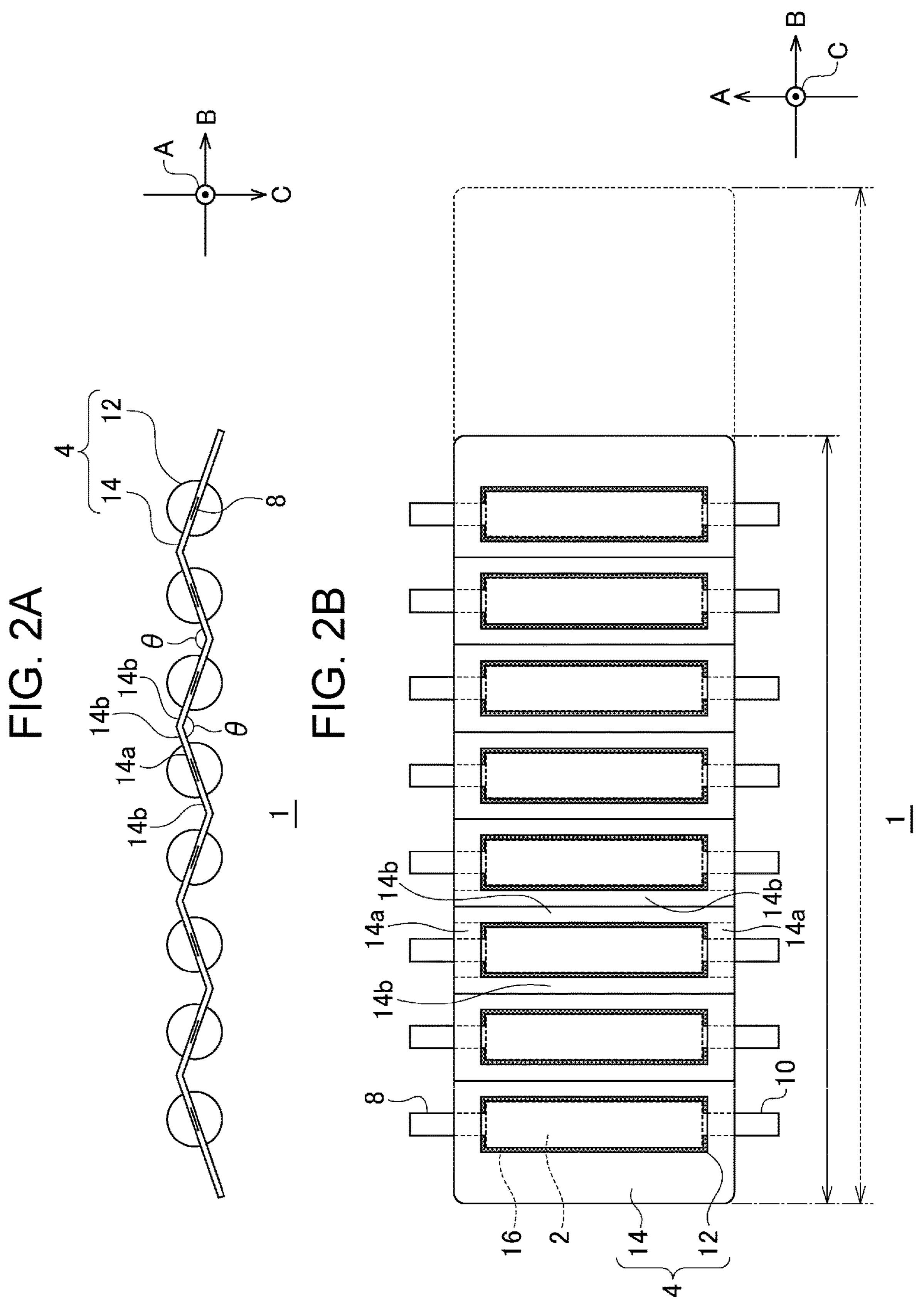
FIG. 2A is a schematic diagram of the power storage device as viewed along the axis of the power storage device.
FIG. 2B is a schematic diagram of the power storage device as viewed in an orthogonal direction of the axis.

FIG. 1 is a perspective view of power storage device 1 provided in power storage module 100 according to an exemplary embodiment. FIG. 2A is a schematic diagram of power storage device 1 as viewed in axial direction A. FIG. 2B is a schematic diagram of power storage device 1 as viewed in orthogonal direction C. In FIG. 2B, an inside of film outer covering body 4 is also illustrated for the sake of convenience in description. Furthermore, a state before film outer covering body 4 is folded is illustrated by a broken line. In the present exemplary embodiment, a direction which is along a spiral axis (center axis of a cylinder) of electrode assembly 2 is defined as axial direction A, an arrangement direction of a plurality of electrode assemblies 2 is defined as arrangement direction B, and a direction orthogonal to axial direction A and arrangement direction B is defined as orthogonal direction C.

Power storage device 1 of the present exemplary embodiment is, for example, a rechargeable secondary battery such as a lithium ion battery, a nickel-hydrogen battery, or a nickel-cadmium battery, or a capacitor such as an electric double layer capacitor. Power storage device 1 includes the plurality of electrode assemblies 2 and film outer covering body 4. Although power storage device 1 of the present exemplary embodiment includes eight electrode assemblies 2, the number of electrode assemblies 2 is not particularly limited and may be two or more.

Each of electrode assemblies 2 has a cylindrical shape, and has a wound structure in which a strip-shaped first electrode plate and a strip-shaped second electrode plate are stacked with an inter-electrode separator interposed therebetween and are spirally wound. As an example, the first electrode plate is a negative-electrode plate, and the second electrode plate is a positive-electrode plate. First electrode lead 8 is electrically connected to the first electrode plate. Second electrode lead 10 is electrically connected to the second electrode plate. For example, first electrode lead 8 and second electrode lead 10 have a strip shape (a rectangular shape elongated in one direction), and one end of each is welded to each of the electrode plates. Orientations of the plurality of electrode assemblies 2 are determined such that axial directions A of electrode assemblies 2 are parallel to each other, and the plurality of electrode assemblies 2 are arranged in arrangement direction B at predetermined intervals. The plurality of electrode assemblies 2 are wrapped in common film outer covering body 4.

Film outer covering body 4 has, for example, a structure in which two laminate films are stacked. Each laminate film has a structure in which thermoplastic resin sheets are stacked on both surfaces of a metal sheet such as aluminum. Furthermore, film outer covering body 4 includes a plurality of containers 12 and sealing part 14. The plurality of containers 12 are arranged in arrangement direction B at predetermined intervals. Each of containers 12 has a cylindrical shape, and individually encloses and contains each of electrode assemblies 2. Each of containers 12 is formed of a bag provided in film outer covering body 4. The bag is a part separated from each other in the two laminate films. Accordingly, each of containers 12 protrudes from sealing part 14 along a shape of a side surface of electrode assembly 2. Electrolytic solution 16 is contained in each of containers 12 together with electrode assembly 2.

Sealing part 14 surrounds an outer periphery of each of containers 12 to seal each of containers 12. Sealing part 14 is formed of, for example, a welded part of a thermoplastic resin sheet. The welded part is obtained by performing a thermocompression bonding treatment on an outer periphery of the bag of film outer covering body 4 and welding the thermoplastic resin sheets of the two laminate films to each other. Sealing part 14 seals each of containers 12 and connects the plurality of containers 12 to each other.

Ends of first electrode lead 8 and second electrode lead 10 opposite to the ends connected to electrode assembly 2 protrude toward an outside of film outer covering body 4. An interface between each of the electrode leads and film outer covering body 4 is sealed with a known sealant. In the present exemplary embodiment, first electrode lead 8 and second electrode lead 10 connected to electrode assemblies 2 protrude opposite each other in axial direction A. Furthermore, first electrode leads 8 protrude toward the same side.

Film outer covering body 4 is refracted or curved between adjacent containers 12 and meanders in arrangement direction B. That is, film outer covering body 4, more specifically, sealing part 14 extends approximately in a zigzag manner as viewed in axial direction A. Film outer covering body 4 is folded in a zigzag manner, and thus, an interval between containers 12 in arrangement direction B can be narrowed compared to a state before the film outer covering body is folded. Accordingly, a length of power storage device 1 in arrangement direction B can be shortened.

Furthermore, the plurality of containers 12 of the present exemplary embodiment are disposed such that centers thereof are arranged on the same straight line as viewed in axial direction A in a state where film outer covering body 4 meanders. Accordingly, it is possible to suppress an increase in dimension of power storage device 1 in orthogonal direction C as compared with a case where the plurality of containers 12 are arranged such that the centers thereof are shifted in orthogonal direction C. Furthermore, sealing part 14 bent in a zigzag shape is more inwardly settled than container 12 in orthogonal direction C. Accordingly, it is possible to suppress an increase in dimension of power storage device 1 in orthogonal direction C caused by folding of film outer covering body 4. Note that in the present disclosure, the centers of the plurality of containers 12 are not necessarily positioned on the same straight line.

Sealing part 14 includes a pair of first sides 14*a* and a pair of second sides 14*b* surrounding the periphery of each of containers 12. The pair of first sides 14*a* is arranged in axial direction A with each of containers 12 interposed therebetween, and seals ends of each of containers 12 in axial direction A. First sides 14*a* of the present exemplary embodiment extend linearly through the center of container 12 as viewed in axial direction A. The pair of second sides 14*b* is arranged in a direction orthogonal to axial direction A with each of containers 12 interposed therebetween, and extends in axial direction A to connect the pair of first sides 14*a*.

Two second sides 14*b* positioned between two adjacent containers 12 are connected to each other at predetermined angle θ, that is, non-linearly. Furthermore, directions in which the connection parts of two second sides 14*b* are bent are alternately arranged in the plurality of connection parts arranged in arrangement direction B. As a result, film outer covering body 4 extends in a zigzag manner in arrangement direction B.

Figure 3A:
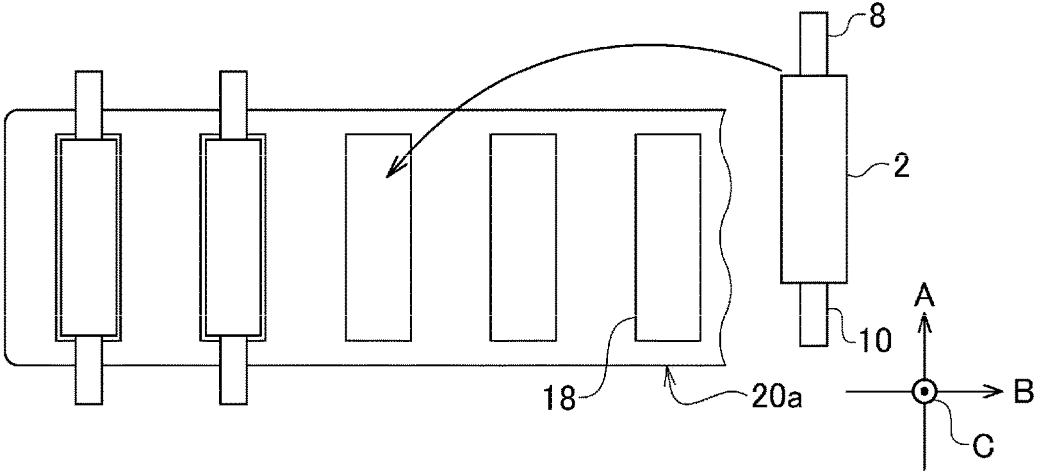
FIG. 3A to FIG. 3C are step diagrams of a method of manufacturing the power storage device.

Hereinafter, an example of a method of manufacturing power storage device 1 will be described. FIG. 3A to FIG. 3C and FIG. 4A to FIG. 4C are step diagrams of a method of manufacturing power storage device 1. First, as illustrated in FIG. 3A, first laminate film 20*a* is prepared. A plurality of depressions 18 having a semi-circular columnar shape are formed in advance in first laminate film 20*a*. The plurality of depressions 18 are formed, for example, by performing a known treatment such as press working on first laminate film 20*a*. Electrode assembly 2 is mounted in each of depressions 18. First electrode lead 8 and second electrode lead 10 are connected to electrode assembly 2 in advance. A sealant (not illustrated) is provided in first electrode lead 8 and second electrode lead 10.

Figure 3B:
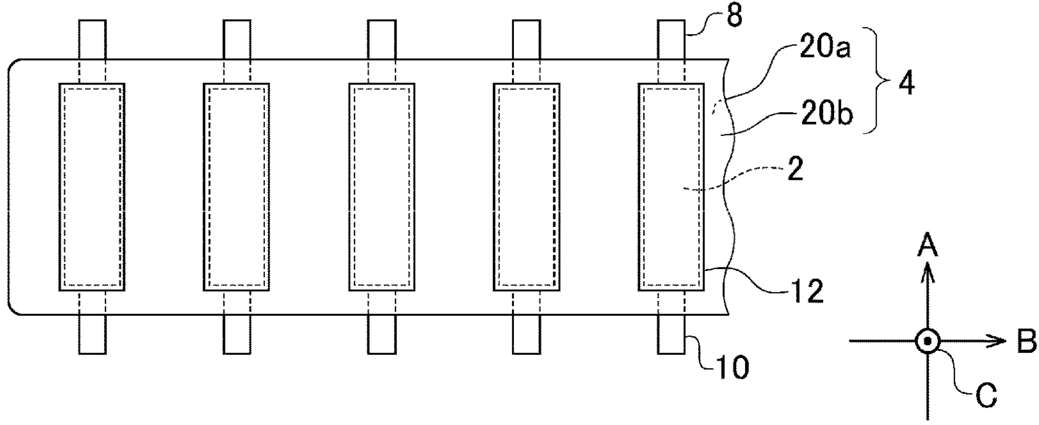

Subsequently, as illustrated in of FIG. 3B, second laminate film 20*b* is overlapped on first laminate film 20*a* to form film outer covering body 4. Depression 18 having a semi-circular columnar shape is provided in second laminate film 20*b* at a position facing each of depressions 18 of first laminate film 20*a*. Thus, first laminate film 20*a* and second laminate film 20*b* are overlapped with each other, and thus, a bag, in other words, container 12 is formed by the pair of depressions 18. A method of forming depression 18 in second laminate film 20*b* is the same as the method of forming depression 18 in first laminate film 20*a*. In a state where electrode assembly 2 is contained in container 12, a distal end of first electrode lead 8 and a distal end of second electrode lead 10 protrude toward the outside of film outer covering body 4.

Figure 3C:
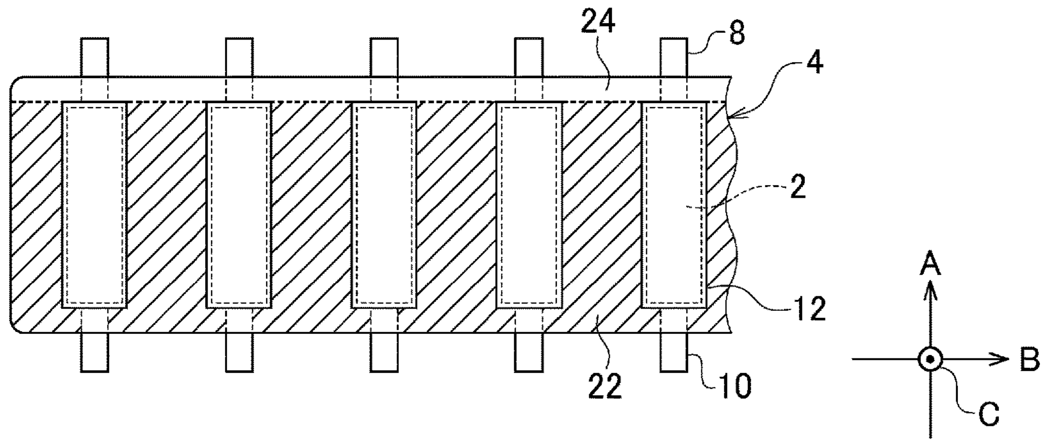

Subsequently, as illustrated in FIG. 3C, a thermocompression bonding treatment is performed on a part of film outer covering body 4 to form welded part 22. A part of film outer covering body 4 on which a thermocompression bonding treatment is not performed is non-welded part 24. Non-welded part 24 is disposed to connect each container 12 and the outside of film outer covering body 4. In the present exemplary embodiment, non-welded part 24 is provided to connect a side from which first electrode lead 8 protrudes among four sides of each container 12 and the outside of film outer covering body 4. The remaining three sides of each container 12 are surrounded by welded part 22. An interface between film outer covering body 4 and second electrode lead 10 is sealed with a sealant.

Figure 4A:
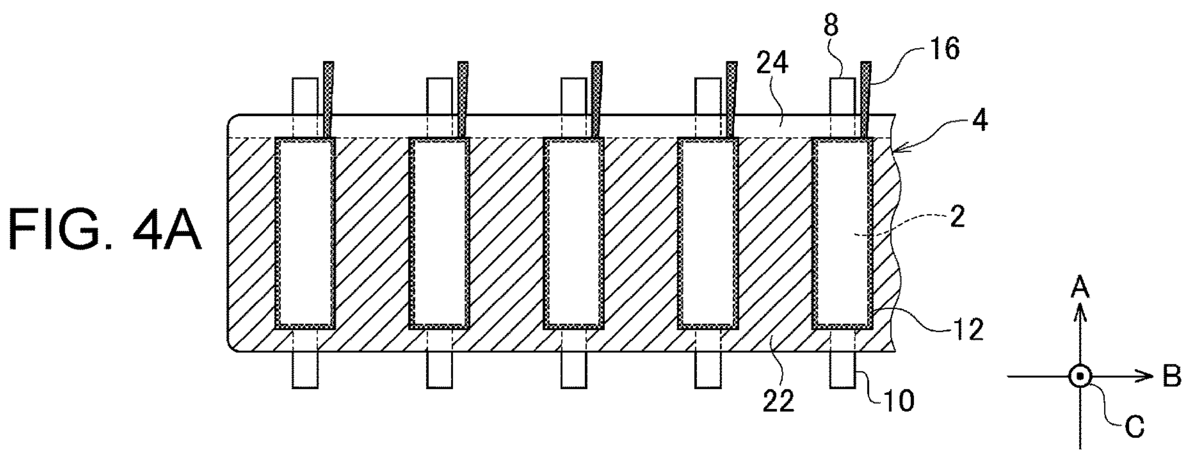
FIG. 4A to FIG. 4C are step diagrams of the method of manufacturing the power storage device.
Figure 4B:
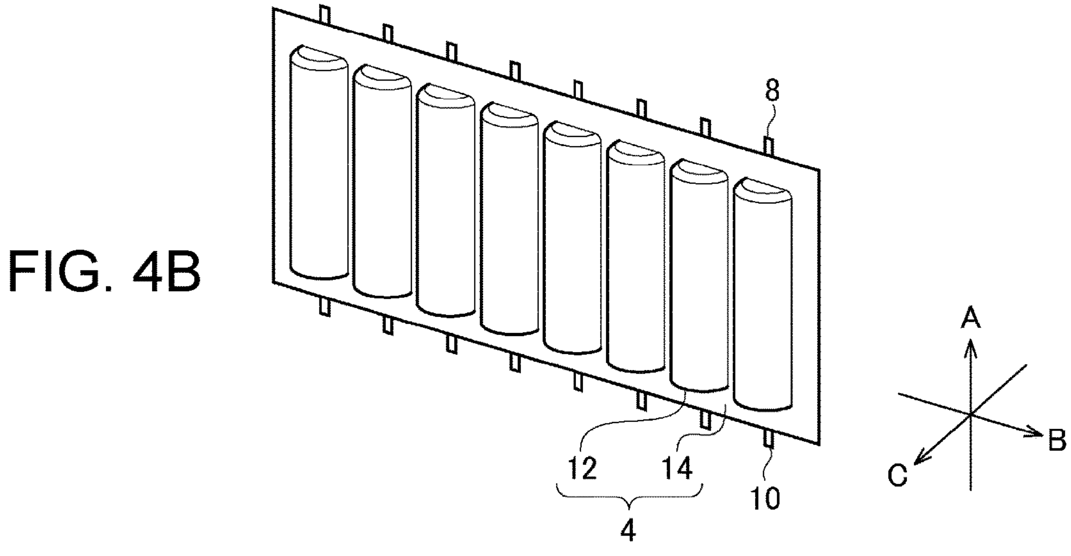
Figure 4C:
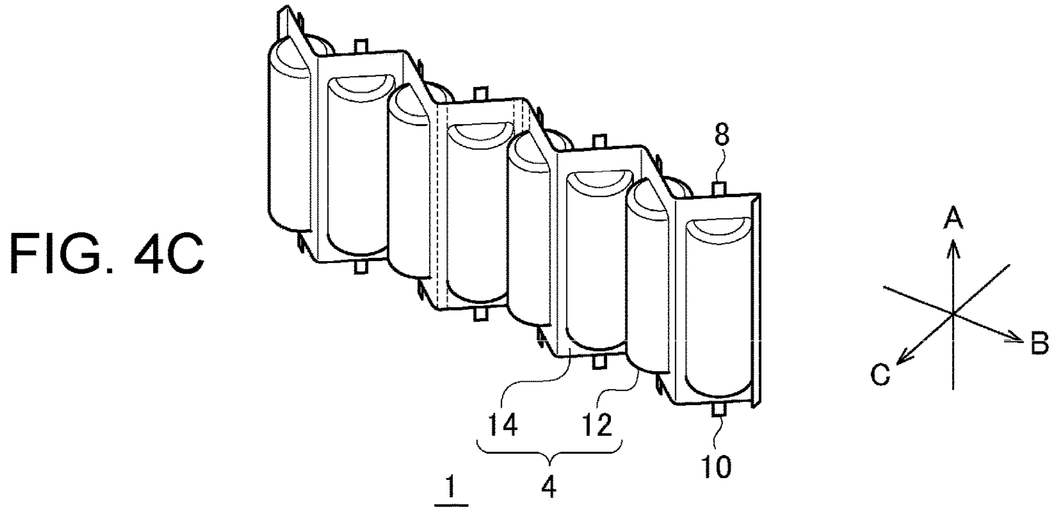

Subsequently, as illustrated in FIG. 4A, electrolytic solution 16 is injected into each container 12 via non-welded part 24. After the injection of electrolytic solution 16, as illustrated in FIG. 4B, a thermocompression bonding treatment is performed on non-welded part 24. As a result, sealing part 14 surrounding the entire periphery of each container 12 is formed. An interface between film outer covering body 4 and first electrode lead 8 is sealed with a sealant. Subsequently, as illustrated in FIG. 4C, film outer covering body 4 is bent in a zigzag manner. Through the above steps, power storage device 1 is obtained.

Note that the method of manufacturing power storage device 1 is not limited to the method described above. For example, each electrode assembly 2 may be wrapped by using one laminate film having a length twice as long as the length of power storage device 1 and folding the laminate film in half. Furthermore, in a case where a required amount of electrolytic solution 16 is small, the step of injecting electrolytic solution 16 illustrated in FIG. 4A can be omitted by infiltrating the inter-electrode separator with electrolytic solution 16 in advance. In this case, in the thermocompression bonding step illustrated in FIG. 3C, a thermocompression bonding treatment is performed on the entire periphery of each container 12 to form sealing part 14.

Figure 5:
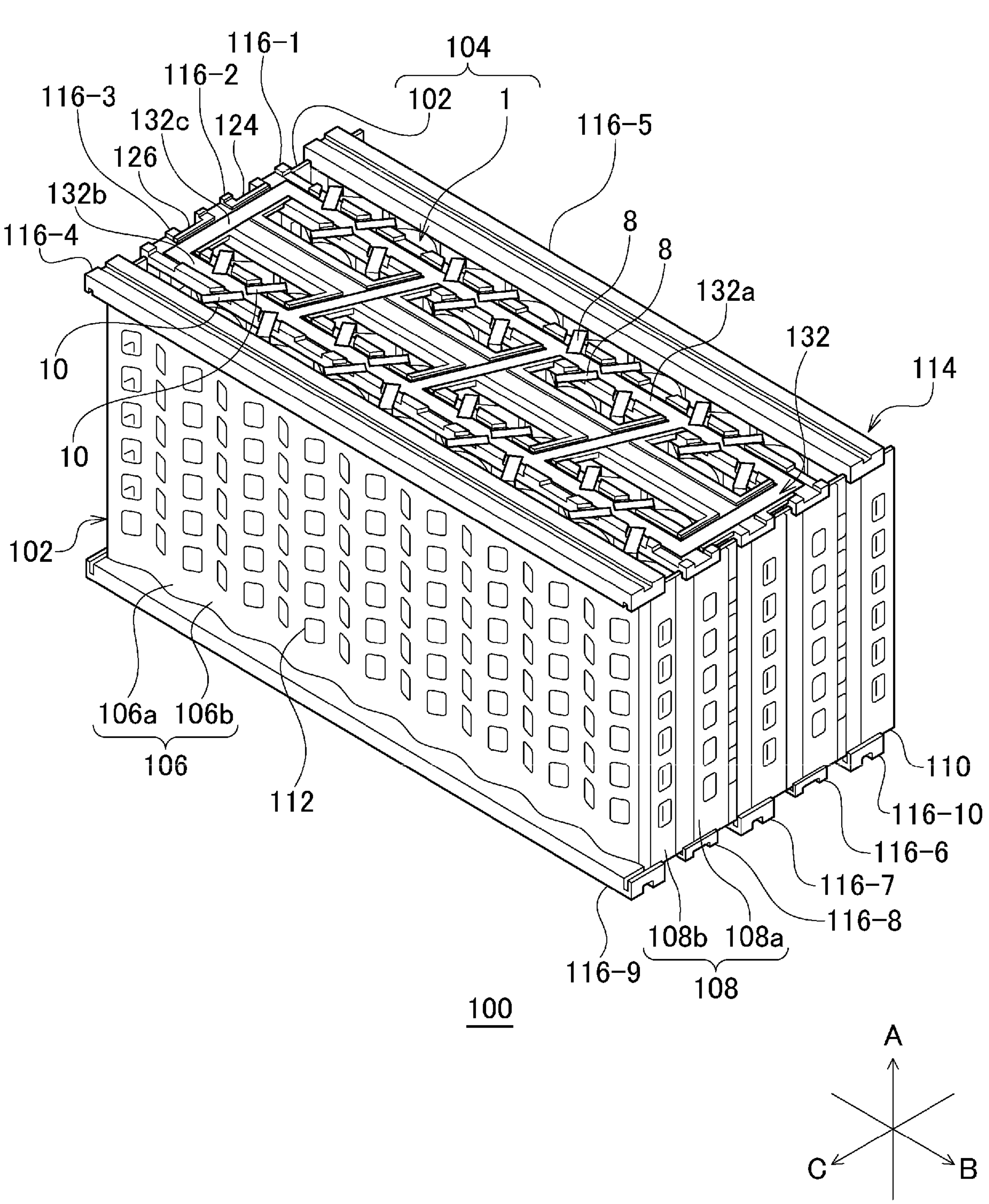
FIG. 5 is a perspective view of the power storage module according to the exemplary embodiment.
Figure 6:
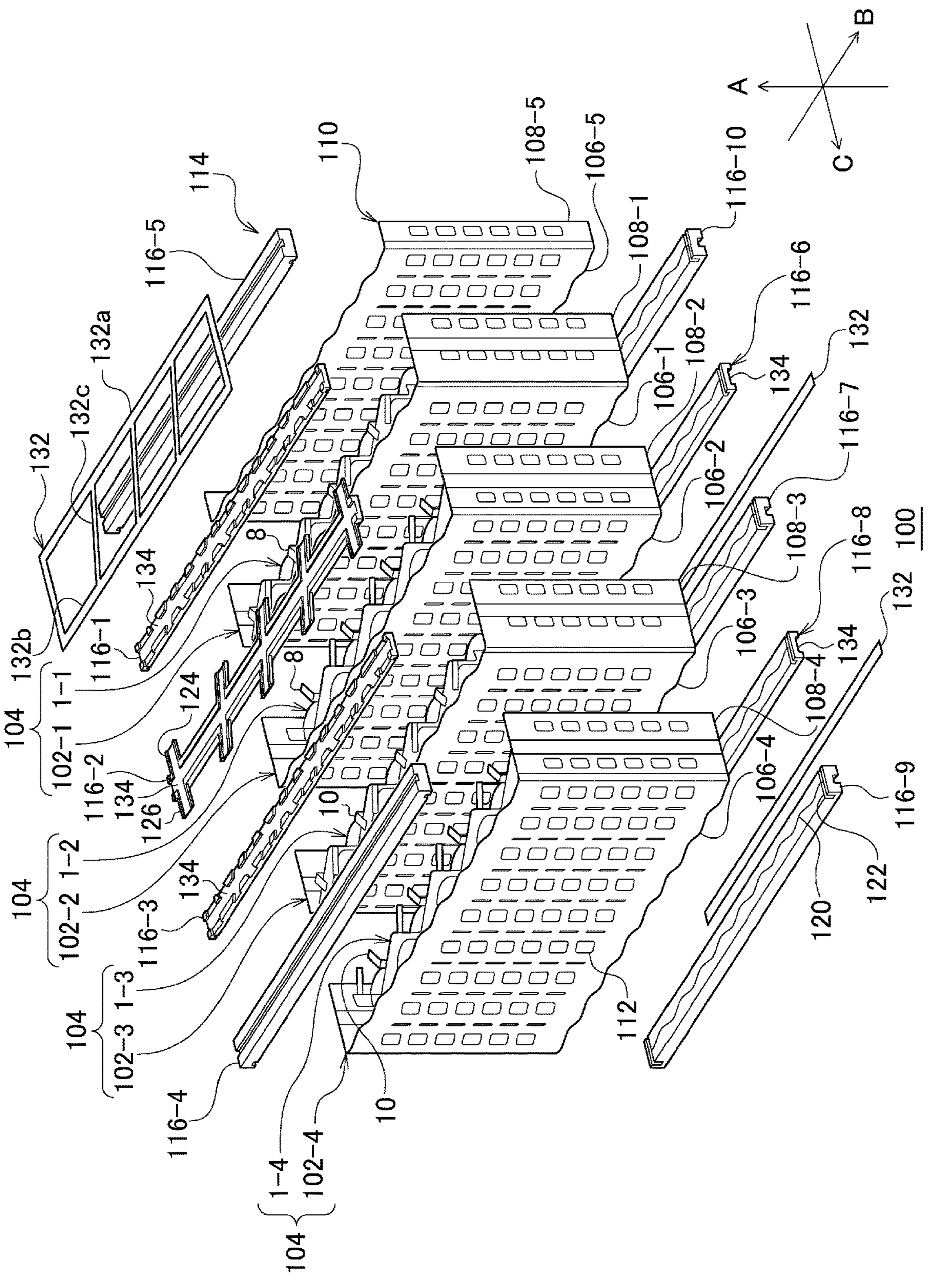
FIG. 6 is an exploded perspective view of the power storage module.

Power storage device 1 is incorporated in power storage module 100 according to the present exemplary embodiment to be described below. FIG. 5 is a perspective view of power storage module 100 according to the exemplary embodiment. FIG. 6 is an exploded perspective view of power storage module 100. Power storage module 100 includes a plurality of power storage devices 1 and a plurality of holders 102. As an example, one power storage device 1 and one holder 102 are combined to constitute one device unit 104, and four device units 104 constitute a power storage module 100. Note that the number of device units 104 constituting power storage module 100 may be two or more. Furthermore, in device unit 104, a plurality of power storage devices 1 may be assembled to one holder 102.

Device units 104 are arranged in orthogonal direction C. Furthermore, an orientation of each of device units 104 is determined such that containers 12 of power storage device 1 are arranged in the same direction. Two power storage devices 1 adjacent to each other in the orthogonal direction C are disposed so as to be shifted from each other in arrangement direction B such that an axial center of electrode assembly 2 of the other of power storage devices 1 is positioned between the axial centers of two adjacent electrode assemblies 2 in one of power storage devices 1. That is, container 12 of the other of power storage devices 1 is fitted between valleys of two containers 12 of one of power storage devices 1. Accordingly, a dimension of power storage module 100 in orthogonal direction C can be reduced.

In each device unit 104, power storage device 1 is held by holder 102. Holder 102 according to the present exemplary embodiment includes side plate 106 and a pair of protrusions 108. Side plate 106 is a rectangular plate extending in arrangement direction B. The pair of protrusions 108 are rectangular plates protruding or extending in orthogonal direction C from both ends of side plate 106 in arrangement direction B. In the present disclosure, "protruding or extending in orthogonal direction C" means that one end of a target member or part and an opposite end are shifted in orthogonal direction C. The pair of protrusions 108 faces each other in arrangement direction B. Therefore, holder 102 has a substantially U-shape that is long in arrangement direction B. An orientation of holder 102 is determined such that a main surface of side plate 106 faces orthogonal direction C and a main surface of each of protrusions 108 faces arrangement direction B.

Holder 102 is formed of, for example, one plate material. Side plate 106 and the pair of protrusions 108 can be formed by, for example, bending both ends of a metal plate. Note that holder 102 may be made of a resin as long as predetermined or higher rigidity is obtained. Furthermore, side plate 106 and protrusion 108, which are separate bodies, may be joined to constitute holder 102. Examples of the metal used for holder 102 include aluminum, an aluminum alloy, and steel. Furthermore, examples of the resin used for the holder 102 include thermoplastic resins such as polypropylene (PP), polybutylene terephthalate (PBT), polycarbonate (PC), and Noryl (registered trademark) resin (modified PPE), fiber-reinforced plastics (FRP) including carbon fiber-reinforced plastics (CFRP), glass fiber-reinforced plastics (GFRP), and the like.

Power storage device 1 is surrounded by holder 102 on three sides in arrangement direction B and orthogonal direction C. Side plate 106 covers one surface of power storage device 1 in orthogonal direction C. The pair of protrusions 108 covers both surfaces of power storage device 1 in arrangement direction B. As an example, side plate 106 is fixed to facing power storage device 1 with an adhesive. The adhesive is preferably an adhesive having an insulating property. Note that an insulating sheet may be interposed between power storage device 1 and holder 102.

Each of power storage devices 1 is disposed in orthogonal direction C in a state where holder 102 has been assembled. That is, the plurality of device units 104 are arranged in orthogonal direction C. At this time, each of power storage devices 1 is disposed such that an exposed surface that is not covered with holder 102 faces the same direction. In a state where power storage devices 1 are arrayed, the exposed surfaces of power storage devices 1 are covered with side plate 106 of adjacent device unit 104 and are fixed with an adhesive. Accordingly, at least a part of power storage device 1 is sandwiched between two side plates 106. Furthermore, at least a part of side plate 106 is sandwiched between two power storage devices 1.

Furthermore, each of protrusions 108 includes tip end 108*a* and base end 108*b*. Base end 108*b* is interposed between side plate 106 and tip end 108*a*. Tip end 108*a* is shifted in a direction separated from power storage device 1 with respect to base end 108*b*. Accordingly, a distance between the pair of protrusions 108 is wider near tip end 108*a* than near base end 108*b*. Each of tip ends 108*a* protrudes to a position overlapping base end 108*b* of adjacent holder 102 when viewed in arrangement direction B.

That is, when the plurality of device units 104 are arranged in orthogonal direction C, in two adjacent holders 102, side plate 106 and a pair of base ends 108*b* in the other of holders 102 enter between a pair of tip ends 108*a* in one of holders 102. A known joining treatment such as laser welding is performed on a part where tip end 108*a* of one of holders 102 and base end 108*b* of the other of holders 102 overlap each other. As a result, holders 102 are connected to integrate the plurality of device units 104.

Side plate 106 includes a plurality of recesses 106*a* arranged in arrangement direction B. Each of recesses 106*a* has a groove shape extending in axial direction A. In a state where holder 102 has been assembled to power storage device 1, each container 12 of power storage device 1 facing side plate 106 is fitted into each of recesses 106*a*. As a result, side plate 106 extends along a curved surface of each container 12. Accordingly, power storage device 1 can be more stably held. In particular, displacement of power storage device 1 in arrangement direction B can be regulated.

Furthermore, the side plate 106 of the present exemplary embodiment has a corrugated plate shape that repeats irregularities in arrangement direction B. That is, as viewed from one main surface, the plurality of recesses 106*a* and a plurality of protrusions 106*b* are alternately arranged in arrangement direction B. In the present exemplary embodiment, in each device unit 104, as viewed from the side of one main surface facing power storage device 1, a part curved in a direction away from power storage device 1 is defined as recess 106*a*, and a part curved in a direction approaching power storage device 1 is defined as protrusion 106*b*.

Thus, each of containers 12 of power storage devices 1 arranged on both sides with side plate 106 interposed therebetween can be fitted into side plate 106. Specifically, for recesses 106*a* and protrusions 106*b* when side plate 106 is viewed from one main surface, each of containers 12 of one power storage device 1 is fitted into each of recesses 106*a*. Furthermore, each of containers 12 of the other of power storage devices 1 is fitted to each of protrusions 106*b* (which are recesses as viewed from an opposite side) from a back surface. Accordingly, the stability of each power storage device 1 in power storage module 100 can be further enhanced. Note that side plate 106 may be a plate having a thickness larger than a thickness of the corrugated plate and provided with a plurality of recesses arranged in arrangement direction B on both surfaces.

Device unit 104 positioned at one end in orthogonal direction C has no other device unit 104 near the exposed surface. Thus, end holder 110 is assembled to the exposed surface of power storage device 1 in device unit 104. End holder 110 as an example has the same shape as holder 102 except that protrusion 108 does not have tip end 108*a*.

Furthermore, a plurality of through-holes 112 are provided in side plate 106 and the pair of protrusions 108 of the present exemplary embodiment. The plurality of through-holes 112 provided in side plate 106 penetrate side plate 106 in a plate thickness of side plate 106. Furthermore, the plurality of through-holes 112 are arrayed in a matrix. Similarly, the plurality of through-holes 112 provided in each of protrusions 108 penetrate protrusion 108 in a plate thickness of protrusion 108. Furthermore, the plurality of through-holes 112 are arrayed in a matrix. A weight of power storage module 100 can be reduced by providing through-holes 112.

Furthermore, power storage module 100 includes reinforcement member 114. Reinforcement member 114 is a member that is fitted to the plurality of holders 102 to increase rigidity of the plurality of holders 102. Reinforcement member 114 includes a plurality of reinforcement parts extending in arrangement direction B and aligned with side plates 106 in axial direction A. Each of the reinforcement parts includes side plate groove 120 in which side plate 106 is fitted on a surface facing side plate 106. Furthermore, reinforcement member 114 has a connection part that connects any two reinforcement parts adjacent to each other. The connection part is at least temporarily slidably connected to at least one of the two reinforcement parts. In reinforcement member 114, power storage devices 1 held by holders 102 are arranged in orthogonal direction C, and adjacent holders 102 are fitted into respective holders 102 in a connected state. Note that, after the reinforcement parts are fitted into the holder 102, holder 102 may be attached to power storage device 1. Hereinafter, reinforcement member 114 will be described in detail.

The plurality of power storage devices 1 include first power storage device 1-1 and second power storage device 1-2. First power storage device 1-1 and second power storage device 1-2 are arranged in orthogonal direction C. Furthermore, the plurality of holders 102 include first holder 102-1 and second holder 102-2. First holder 102-1 includes first side plate 106-1 and first protrusion 108-1, and constitutes device unit 104 together with first power storage device 1-1. Second holder 102-2 includes second side plate 106-2 and second protrusion 108-2, and constitutes device unit 104 together with second power storage device 1-2.

In the present exemplary embodiment, the plurality of power storage devices 1 further include third power storage device 1-3 and fourth power storage device 1-4. First power storage device 1-1, second power storage device 1-2, third power storage device 1-3, and fourth power storage device 1-4 are arranged in this order in orthogonal direction C. Furthermore, the plurality of holders 102 include third holder 102-3 and fourth holder 102-4. Third holder 102-3 includes third side plate 106-3 and third protrusion 108-3, and constitutes device unit 104 together with third power storage device 1-3. Fourth holder 102-4 includes fourth side plate 106-4 and fourth protrusion 108-4, and constitutes device unit 104 together with fourth power storage device 1-4.

Note that in power storage module 100 of this exemplary embodiment, first power storage device 1-1 is in contact with end holder 110, but an arrangement of first power storage device 1-1 in power storage module 100 is not particularly limited. Furthermore, in the following description, for convenience of description, the side plate and the protrusion of end holder 110 are referred to as fifth side plate 106-5 and fifth protrusion 108-5.

Reinforcement member 114 includes first reinforcement part 116-1 to tenth reinforcement part 116-10. Each of first reinforcement part 116-1 to tenth reinforcement part 116-10 is a substantially flat bar-shaped member extending in arrangement direction B. First reinforcement part 116-1 and sixth reinforcement part 116-6 are arranged with first side plate 106-1 interposed therebetween in axial direction A. Second reinforcement part 116-2 and seventh reinforcement part 116-7 are arranged with second side plate 106-2 interposed therebetween in axial direction A. Third reinforcement part 116-3 and eighth reinforcement part 116-8 are arranged with third side plate 106-3 interposed therebetween in axial direction A. Fourth reinforcement part 116-4 and Ninth reinforcement part 116-9 are arranged with fourth side plate 106-4 interposed therebetween in axial direction A. Fifth reinforcement part 116-5 and tenth reinforcement part 116-10 are arranged with fifth side plate 106-5 interposed therebetween in axial direction A.

Figure 7:
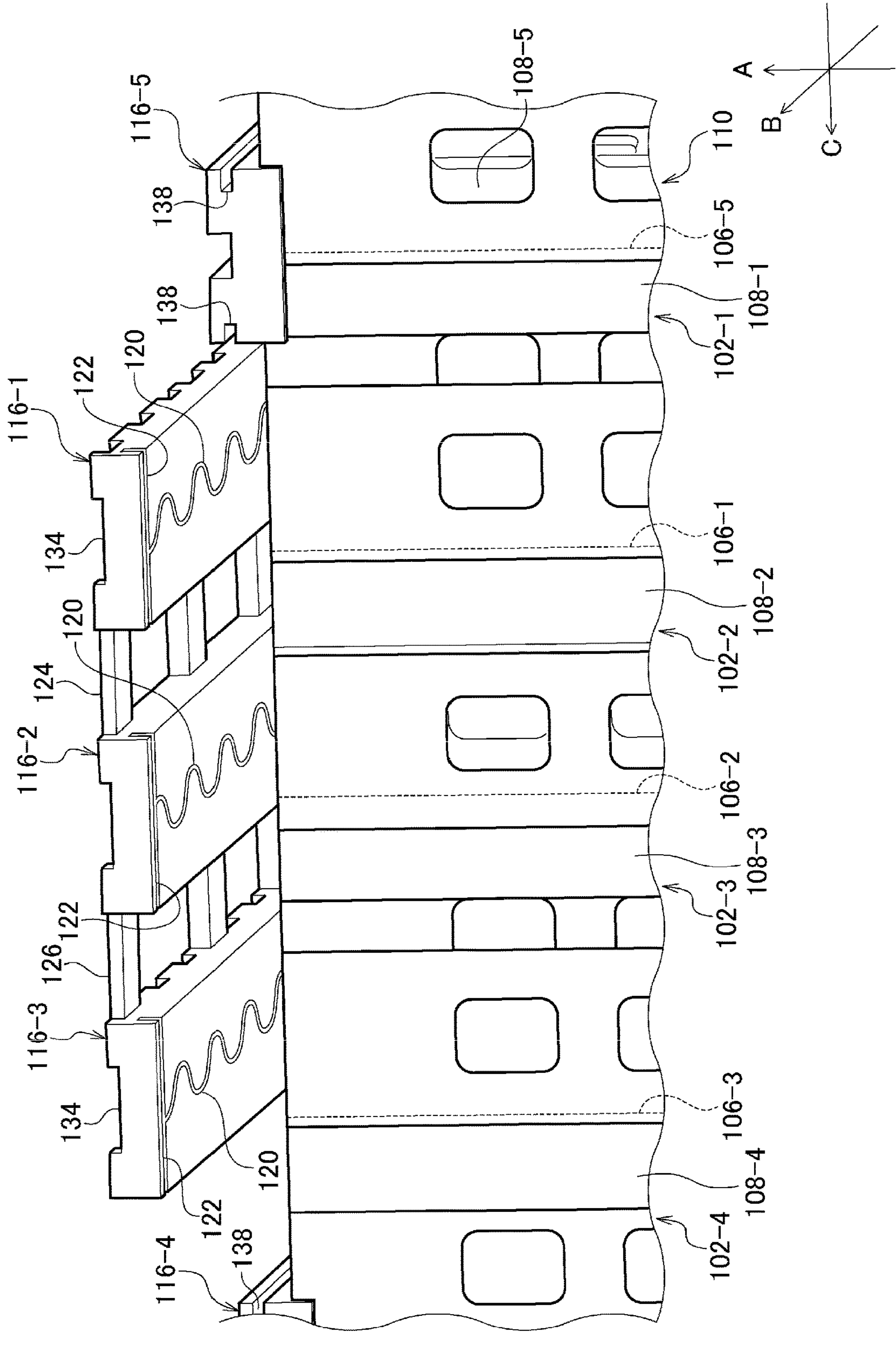
FIG. 7 is an enlarged perspective view illustrating a first reinforcement part to a third reinforcement part.

FIG. 7 is an enlarged perspective view illustrating first reinforcement part 116-1 to third reinforcement part 116-3. As illustrated in FIG. 7, first reinforcement part 116-1 has side plate groove 120 into which first side plate 106-1 is fitted on a surface facing first side plate 106-1. An edge of first side plate 106-1 in axial direction A is fitted into side plate groove 120. Since first side plate 106-1 of the present exemplary embodiment is a corrugated plate, side plate groove 120 has a corrugated shape.

Furthermore, first reinforcement part 116-1 has protrusion groove 122 in which first protrusion 108-1 and second protrusion 108-2 are fitted on a surface facing first side plate 106-1. Protrusion groove 122 extends in orthogonal direction C from both ends of side plate groove 120 in arrangement direction B. Edges of first protrusion 108-1 and second protrusion 108-2 in axial direction A are fitted into protrusion groove 122. Similarly, second reinforcement part 116-2 includes, on its surface facing second side plate 106-2, side plate groove 120 into which second side plate 106-2 is fitted, and protrusion groove 122 into which second protrusion 108-2 and third protrusion 108-3 are fitted. Furthermore, third reinforcement part 116-3 includes side plate groove 120 into which third side plate 106-3 is fitted, and protrusion groove 122 into which third protrusion 108-3 and fourth protrusion 108-4 are fitted on a surface facing third side plate 106-3.

Furthermore, although not illustrated, fourth reinforcement part 116-4 includes side plate groove 120 into which fourth side plate 106-4 is fitted and protrusion groove 122 into which fourth protrusion 108-4 is fitted on a surface facing fourth side plate 106-4. Furthermore, fifth reinforcement part 116-5 includes side plate groove 120 into which fifth side plate 106-5 is fitted, and protrusion groove 122 into which fifth protrusion 108-5 and first protrusion 108-1 are fitted on a surface facing fifth side plate 106-5. Moreover, as illustrated in FIG. 6, each of sixth reinforcement part 116-6 to tenth reinforcement part 116-10 also includes side plate groove 120 and protrusion groove 122 on a surface facing a side of each side plate 106.

By fitting the edge of side plate 106 into side plate groove 120 of each of the reinforcement parts, the rigidity of each of the holders (first holder 102-1 to fourth holder 102-4 and end holder 110) can be enhanced. Furthermore, since the edge of first protrusion 108 is fitted into protrusion groove 122, the rigidity of each holder can be further enhanced. Furthermore, side plate groove 120 and protrusion groove 122 of the present exemplary embodiment are connected to each other. With this configuration, a corner part, which is a connection part between side plate 106 and protrusion 108 in each holder, can be accommodated in the groove. As a result, the holders can be held more firmly.

Note that protrusion groove 122 may not be connected to side plate groove 120 or may not be provided in each reinforcement part. Furthermore, each protrusion 108 of the present exemplary embodiment has a uniform dimension in axial direction A. Therefore, two protrusions 108 are fitted into at least a part of protrusion groove 122. Specifically, in two holders 102 adjacent to each other in orthogonal direction C, tip end **108*a* of one of holders 102 and base end 108*b* of the other of holders 102** are fitted.

However, protrusion 108 and the protrusion groove 122 are not limited to this configuration. For example, both ends or one end of tip end **108*a* of each protrusion 108 in axial direction A may be cut out. With this configuration, it is possible to form one protrusion 108 to be fitted in protrusion groove 122. Accordingly, regardless of the position of holder 102 with respect to power storage module 100, that is, regardless of holder 102 disposed at an end in orthogonal direction C or holder 102 disposed near the center in orthogonal direction C, the shape of the groove provided in the reinforcement part can be made uniform. For example, a dimension in axial direction A of tip end 108*a* in which the end in axial direction A is cut out is equal to a distance between two reinforcement parts sandwiching holder 102** in axial direction A.

Figure 8A:
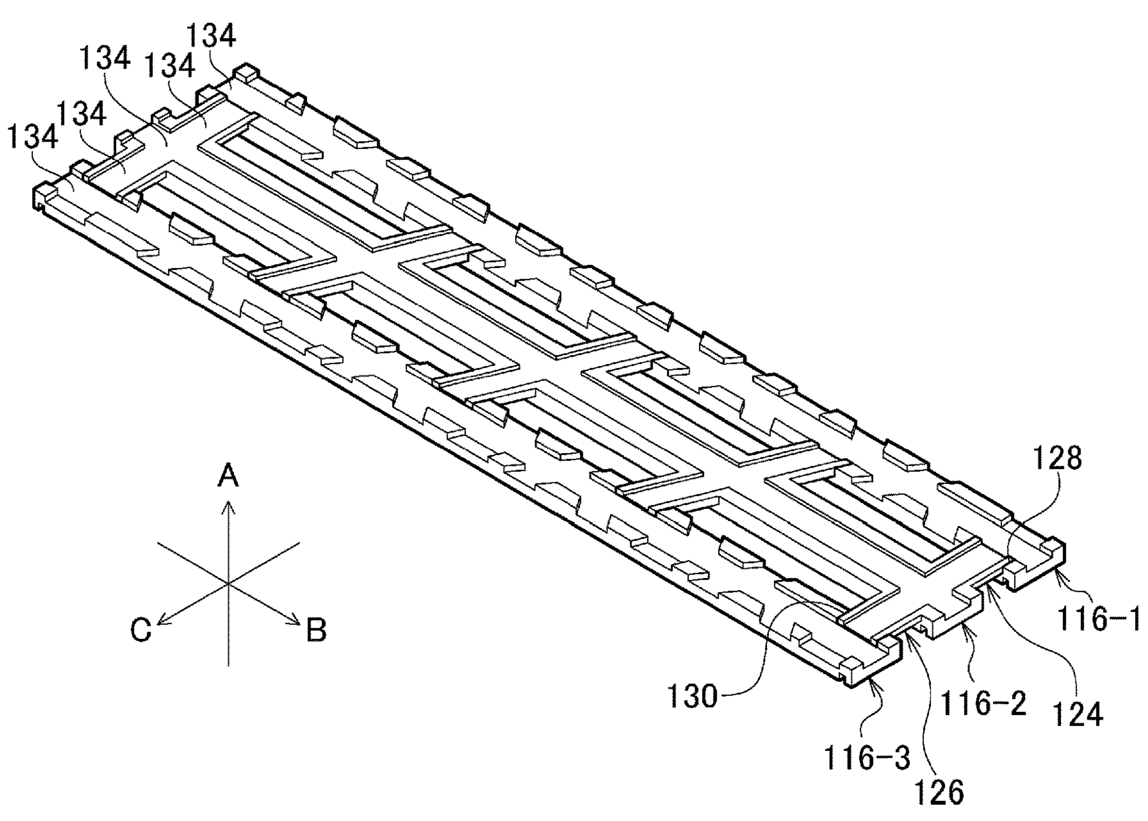
FIG. 8A is a perspective view of the first reinforcement part to the third reinforcement part in an assembled state.
Figure 8B:
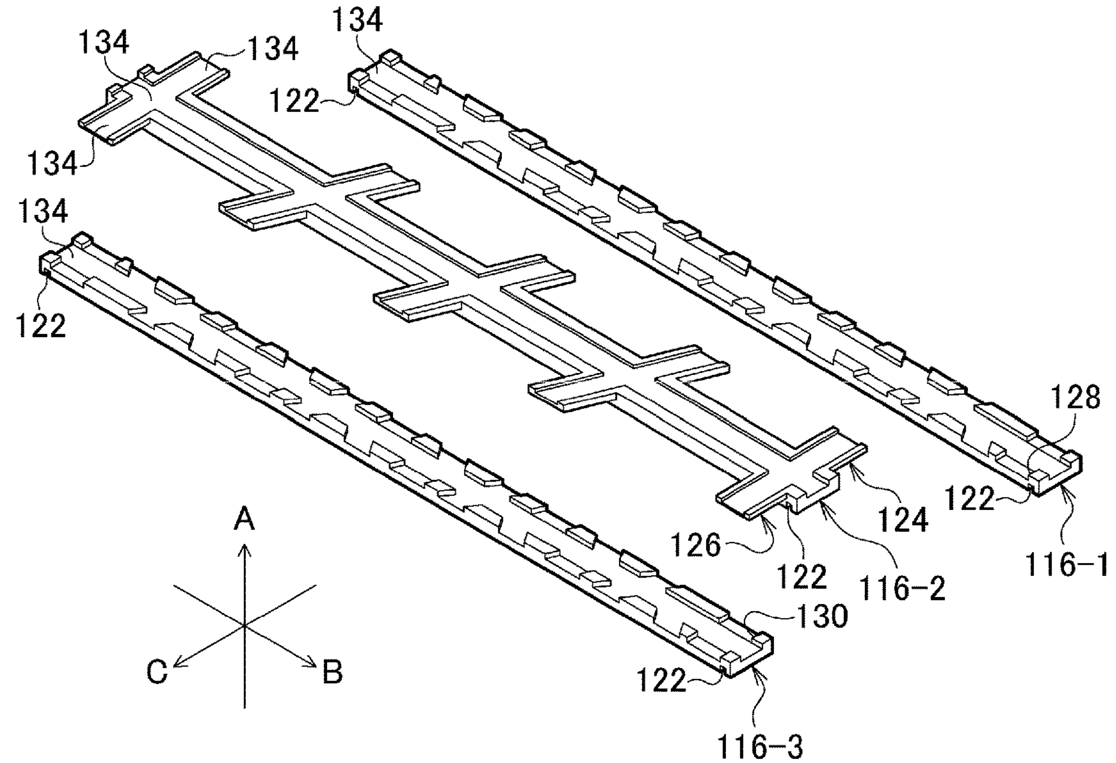
FIG. 8B is a perspective view of the first reinforcement part to the third reinforcement part in a state before being assembled.

Furthermore, reinforcement member 114 includes first connection part 124 and second connection part 126. Both first connection part 124 and second connection part 126 have a substantially flat rod shape and extend in orthogonal direction C. FIG. 8A is a perspective view of first reinforcement part 116-1 to third reinforcement part 116-3 in an assembled state. FIG. 8B is a perspective view of first reinforcement part 116-1 to third reinforcement part 116-3 in a state before being assembled.

First connection part 124 is a part that connects first reinforcement part 116-1 and second reinforcement part 116-2. Reinforcement member 114 of the present exemplary embodiment includes a plurality of first connection parts 124 arranged in arrangement direction B between first reinforcement part 116-1 and second reinforcement part 116-2. Each of first connection parts 124 extends in orthogonal direction C, and has one end connected to first reinforcement part 116-1 and the other end connected to second reinforcement part 116-2. Furthermore, each of first connection parts 124 is connected to at least one of first reinforcement part 116-1 and second reinforcement part 116-2 in a slidable manner at least temporarily.

First connection part 124 of the present exemplary embodiment is configured of a part of a member constituting second reinforcement part 116-2. Each of first connection parts 124 extends from second reinforcement part 116-2 toward first reinforcement part 116-1. First reinforcement part 116-1 includes recess 128 in which a part of first connection part 124 is slidably fitted on a surface facing opposite to first side plate 106-1. Recess 128 constitutes a slide mechanism of first connection part 124. A width (dimension in arrangement direction B) of an inner peripheral surface of recess 128 is set to be larger than a width of a cross section orthogonal to a protruding direction of first connection part 124. Then, a tip of first connection part 124 extending from second reinforcement part 116-2 is placed on first reinforcement part 116-1 and fitted into recess 128. As a result, a gap is formed between recess 128 and a part of first connection part 124 accommodated in recess 128 in arrangement direction B, and first connection part 124 is slidably connected to first reinforcement part 116-1. First connection part 124 is slidable with respect to first reinforcement part 116-1 in the protruding direction of first connection part 124. Note that, as described later, a bottom surface of recess 128 can be positioned closer to power storage device 1 in axial direction A than a bottom surface of mounting part 134 formed on first reinforcement part 116-1. A step between these two bottom surfaces constitutes a side wall of recess 128 in orthogonal direction C. In this case, a gap may be formed between recess 128 and a part (tip) of first connection part 124 accommodated in recess 128 in orthogonal direction C. Also with this configuration, first connection part 124 can be slidably connected to first reinforcement part 116-1. Note that the side wall may be a surface perpendicular to the bottom surface of recess 128, or may be an inclined surface or a curved surface.

Since first reinforcement part 116-1 and second reinforcement part 116-2 are connected by first connection part 124, relative displacement between first reinforcement part 116-1 and second reinforcement part 116-2 can be restricted. In particular, displacement in arrangement direction B can be regulated. Accordingly, rigidity of power storage module 100 can be enhanced. Furthermore, first connection part 124 is slidably connected to first reinforcement part 116-1. Therefore, a distance between side plate groove 120 of first reinforcement part 116-1 and side plate groove 120 of second reinforcement part 116-2 can be flexibly changed according to a distance between first side plate 106-1 and second side plate 106-2.

First connection part 124 only needs to be slidable with respect to first reinforcement part 116-1 at least until fitting of each reinforcement part into each side plate 106 is finished (that is, at least temporarily). Therefore, first connection part 124 and first reinforcement part 116-1 may be fixed by adhesion or the like after the reinforcement parts are fitted into side plates 106. With such a configuration, the relative displacement between first reinforcement part 116-1 and second reinforcement part 116-2 can be regulated more firmly and hence, rigidity of power storage module 100 can be further enhanced. Note that, even in a case where first connection part 124 and first reinforcement part 116-1 are not fixed, it is possible to regulate the relative displacement between first reinforcement part 116-1 and second reinforcement part 116-2 to some extent.

Furthermore, first connection part 124 may be configured of a part of a member constituting first reinforcement part 116-1, and may be slidably connected to second reinforcement part 116-2. Alternatively, both first reinforcement part 116-1 and second reinforcement part 116-2 may be slidably connected. In a case where first connection part 124 is slidably connected to both first reinforcement part 116-1 and second reinforcement part 116-2, it is preferable to fix first connection part 124 to at least one of first reinforcement part 116-1 and second reinforcement part 116-2 after fitting each reinforcement part into each side plate 106.

Second connection part 126 is a part connecting second reinforcement part 116-2 and third reinforcement part 116-3. Reinforcement member 114 of the present exemplary embodiment includes a plurality of second connection parts 126 arranged in arrangement direction B between second reinforcement part 116-2 and third reinforcement part 116-3. Each of second connection parts 126 extends in orthogonal direction C, and has one end connected to second reinforcement part 116-2 and the other end connected to third reinforcement part 116-3. Furthermore, each of second connection parts 126 is connected to at least one of second reinforcement part 116-2 and third reinforcement part 116-3 in a slidable manner at least temporarily.

Second connection part 126 of the present exemplary embodiment is configured of a part of a member constituting second reinforcement part 116-2. Each of second connection parts 126 extends from second reinforcement part 116-2 toward third reinforcement part 116-3. Third reinforcement part 116-3 includes recess 130 in which a part of second connection part 126 is slidably fitted on a surface facing an opposite side of third side plate 106-3. Recess 130 constitutes a slide mechanism of second connection part 126. A width (dimension in arrangement direction B) of an inner peripheral surface of recess 130 is set to be larger than a width of a cross section orthogonal to a protruding direction of second connection part 126. Then, a tip of second connection part 126 extending from second reinforcement part 116-2 is placed on third reinforcement part 116-3 and fitted into recess 130. As a result, a gap is formed between recess 130 and a part of second connection part 126 accommodated in recess 130 in arrangement direction B, and second connection part 126 is slidably connected to third reinforcement part 116-3. Second connection part 126 is slidable with respect to third reinforcement part 116-3 in the protruding direction of second connection part 126. Note that, as described later, a bottom surface of recess 130 can be positioned closer to power storage device 1 in axial direction A than a bottom surface of mounting part 134 formed on third reinforcement part 116-3. A step between these two bottom surfaces constitutes a side wall of recess 130 in orthogonal direction C. In this case, a gap may be formed between recess 130 and a part (tip end surface) of second connection part 126 accommodated in recess 130 in orthogonal direction C. Also with this configuration, second connection part 126 can be slidably connected to third reinforcement part 116-3. The side wall may be a surface perpendicular to the bottom surface of recess 130, or may be an inclined surface or a curved surface.

Since second reinforcement part 116-2 and third reinforcement part 116-3 are connected by second connection part 126, relative displacement between second reinforcement part 116-2 and third reinforcement part 116-3 can be restricted. In particular, displacement in arrangement direction B can be regulated. Accordingly, rigidity of power storage module 100 can be enhanced. Furthermore, second connection part 126 is slidably connected to third reinforcement part 116-3. Therefore, a distance between side plate groove 120 of second reinforcement part 116-2 and side plate groove 120 of third reinforcement part 116-3 can be flexibly changed according to a distance between second side plate 106-2 and third side plate 106-3.

Second connection part 126 only needs to be slidable with respect to third reinforcement part 116-3 at least until fitting of each reinforcement part into each side plate 106 is finished. Therefore, second connection part 126 and third reinforcement part 116-3 may be fixed by adhesion or the like after the reinforcement parts are fitted into side plates 106. With such a configuration, the relative displacement between second reinforcement part 116-2 and third reinforcement part 116-3 can be regulated more firmly and hence, rigidity of power storage module 100 can be further enhanced. Note that, even in a case where second connection part 126 and third reinforcement part 116-3 are not fixed, it is possible to regulate the relative displacement between second reinforcement part 116-2 and third reinforcement part 116-3 to some extent.

Furthermore, second connection part 126 may be configured of a part of a member constituting third reinforcement part 116-3, and may be slidably connected to second reinforcement part 116-2. Alternatively, both second reinforcement part 116-2 and third reinforcement part 116-3 may be slidably connected. In a case where second connection part 126 is slidably connected to both second reinforcement part 116-2 and third reinforcement part 116-3, it is preferable to fix second connection part 126 to at least one of second reinforcement part 116-2 and third reinforcement part 116-3 after fitting each reinforcement part into each side plate 106.

In the present disclosure, "configured of a part of a member constituting second reinforcement part 116-2" means that second reinforcement part 116-2 and each connection part, which are originally separate bodies, are not integrated as a result of being fixed to each other by a known fixing method such as welding or adhesion, but one member is subjected to known molding processing such as press working or injection molding, and second reinforcement part 116-2 and each connection part are formed in one member. That is, a part of the member constituting second reinforcement part 116-2 extends toward a side of first reinforcement part 116-1 to form first connection part 124, and a part of the member extends toward a side of third reinforcement part 116-3 to form second connection part 126.

Furthermore, as illustrated in FIG. 5 to FIG. 8B, power storage module 100 of the present exemplary embodiment includes bus bars 132 which electrically connect the plurality of electrode assemblies 2. Furthermore, reinforcement member 114 has an insulating property and includes mounting part 134 for bus bar 132. That is, reinforcement member 114 also serves as an insulating plate that supports bus bar 132. Bus bar 132 is made of a conductive material such as copper or aluminum. Reinforcement member 114 is made of, for example, a resin having an insulating property. Examples of the resin constituting the reinforcement member 114 include thermoplastic resins such as polypropylene (PP), polybutylene terephthalate (PBT), polycarbonate (PC), and Noryl (registered trademark) resin (modified PPE), fiber-reinforced plastics (FRP) including carbon fiber-reinforced plastics (CFRP), glass fiber-reinforced plastics (GFRP), and the like.

Mounting part 134 is provided on a surface of the predetermined reinforcement part facing opposite to holder 102. In the present exemplary embodiment, mounting part 134 is provided on first reinforcement part 116-1, second reinforcement part 116-2, third reinforcement part 116-3, sixth reinforcement part 116-6, and eighth reinforcement part 116-8. Each mounting part 134 is formed of, for example, a groove-shaped recess corresponding to the shape of bus bar 132. As an example, a depth of mounting part 134 is larger than a thickness of bus bar 132. With this configuration, when power storage module 100 abuts onto surrounding members, it is possible to suppress bus bar 132 from abutting onto the surrounding members. Note that a thickness of bus bar 132 may be larger than a depth of mounting part 134. In this case, a part of bus bar 132 protruding from mounting part 134 may be covered with an insulating cap (not illustrated). Furthermore, a bottom surface of recess 128 into which first connection part 124 is fitted and a bottom surface of recess 130 into which second connection part 126 is fitted may be farther from bus bar 132 in axial direction A than a bottom surface of the recess constituting mounting part 134. That is, recesses 128,130 may be deeper than the recess constituting mounting part 134. With this configuration, heights of the bottom surface of mounting part 134 provided in second reinforcement part 116-2 and the bottom surface of mounting part 134 provided in first reinforcement part 116-1 or third reinforcement part 116-3 can be easily aligned.

Some of bus bars 132 have a band shape extending in arrangement direction B, and are mounted on mounting parts 134 of sixth reinforcement part 116-6 and eighth reinforcement part 116-8. Some of other bus bars 132 have a substantially ladder shape extending in arrangement direction B, and are mounted over respective mounting parts 134 of first reinforcement part 116-1, second reinforcement part 116-2, and third reinforcement part 116-3.

Ladder-shaped bus bar 132 includes first bus bar part 132*a*, second bus bar part 132*b*, and third bus bar part 132*c*. First bus bar part 132*a* is a band-shaped body extending in arrangement direction B, and is mounted on mounting part 134 of first reinforcement part 116-1. Second bus bar part 132*b* is a band-shaped body extending in arrangement direction B, and is mounted on mounting part 134 of third reinforcement part 116-3. Third bus bar part 132*c* is a band-shaped body extending in orthogonal direction C, and is mounted on mounting parts 134 of first connection part 124, second reinforcement part 116-2, and second connection part 126. One end of third bus bar part 132*c* is connected to first bus bar part 132*a*, and the other end is connected to second bus bar part 132*b*. Furthermore, in the present exemplary embodiment, a plurality of third bus bar parts 132*c* are arranged in arrangement direction B. Note that a dimension of each bus bar part in orthogonal direction C may be smaller than an inner dimension of corresponding mounting part 134 in orthogonal direction C. According to this configuration, a gap is generated between each bus bar part and mounting part 134. Due to this gap, in a case where a distance in orthogonal direction C varies between the reinforcement parts, it is possible to absorb the variation at the position between each reinforcement part and each bus bar part.

The electrode lead of first power storage device 1-1 and the electrode lead of second power storage device 1-2 are connected to first bus bar part 132*a*. The electrode lead of third power storage device 1-3 and the electrode lead of fourth power storage device 1-4 are connected to second bus bar 132*b*. For example, each electrode lead is joined to each bus bar part by known joining processing such as laser welding. By interposing reinforcement member 114 between each power storage device 1 and bus bar 132, it is possible to suppress electrical connection between each power storage device 1 and bus bar 132 at a part other than the electrode leads.

In each mounting part 134 of the present exemplary embodiment, a part of a side wall extending in arrangement direction B is cut out. Each electrode lead is connected to first bus bar part 132*a* and second bus bar part 132*b* through the cut out part. Thus, each electrode lead can be easily connected to each bus bar part. Furthermore, since the position of each electrode lead is regulated by the cutout, it is possible to avoid the electrode leads from overlapping each other.

Furthermore, for example, in power storage device 1, two adjacent containers 12 are defined as one set of containers 12 (container unit). Preferably, two containers in which sealing part 14 positioned between two containers 12 is mountain folded with respect to the bus bar part to which the electrode lead extending from these containers 12 is connected (that is, protrudes in a direction away from the bus bar part) are set as the container unit. The cutout of the side wall of mounting part 134 is obliquely provided so that the two electrode leads in each container unit extend in a direction approaching each other. Thus, the electrode leads extending from the two adjacent container units can be separated from each other. In such a configuration, first connection part 124 and second connection part 126 are connected to first reinforcement part 116-1 and third reinforcement part 116-3 in a region between the two container units adjacent to each other. As a result, it is possible to easily avoid first connection part 124 and second connection part 126 from interfering with each electrode lead.

In the present exemplary embodiment, orientations of first power storage device 1-1 and second power storage device 1-2 are determined such that first electrode lead 8 faces first bus bar part 132*a*. Furthermore, orientations of third power storage device 1-3 and fourth power storage device 1-4 are determined such that second electrode lead 10 faces third bus bar part 132*c*. Each of first electrode leads 8 of first power storage device 1-1 and second power storage device 1-2 is connected to first bus bar part 132*a*. Furthermore, each of second electrode leads 10 of third power storage device 1-3 and fourth power storage device 1-4 is connected to second bus bar part 132*b*. Furthermore, third bus bar part 132*c* electrically connects first power storage device 1-1 and second power storage device 1-2 to third power storage device 1-3 and fourth power storage device 1-4.

Furthermore, each of second electrode leads 10 of first power storage device 1-1 and second power storage device 1-2 is connected to bus bar 132 mounted on sixth reinforcement part 116-6. Each of first electrode leads 8 of third power storage device 1-3 and fourth power storage device 1-4 is connected to bus bar 132 mounted on eighth reinforcement part 116-8. With such a configuration, first power storage device 1-1 and second power storage device 1-2 are connected to each other in parallel. Furthermore, third power storage device 1-3 and fourth power storage device 1-4 are connected to each other in parallel. Furthermore, first power storage device 1-1 and second power storage device 1-2 are connected in series to third power storage device 1-3 and fourth power storage device 1-4.

Note that an aspect of the electrical connection of each power storage device 1 is not limited to the above-mentioned aspect. For example, all of first power storage device 1-1 to fourth power storage device 1-4 may be directly connected or may be connected in parallel. Furthermore, in the present exemplary embodiment, in each power storage device 1, the plurality of first electrode leads 8 protrude to the same side and are connected to the same bus bar 132, but an aspect of the electrical connection of each electrode assembly 2 is not particularly limited. For example, in each power storage device 1, first electrode lead 8 and second electrode lead 10 may be alternately arranged, and first electrode lead 8 and second electrode lead 10 adjacent to each other may be electrically connected. That is, in each power storage device 1, the plurality of electrode assemblies 2 may be connected in series.

Furthermore, first electrode lead 8 and second electrode lead 10 may protrude toward the same side in axial direction A. Accordingly, electrode assemblies 2 can be electrically connected to each other only by disposing bus bars 132 on one side of power storage module 100. Therefore, man-hours for assembling power storage module 100 can be reduced.

Figure 9A:
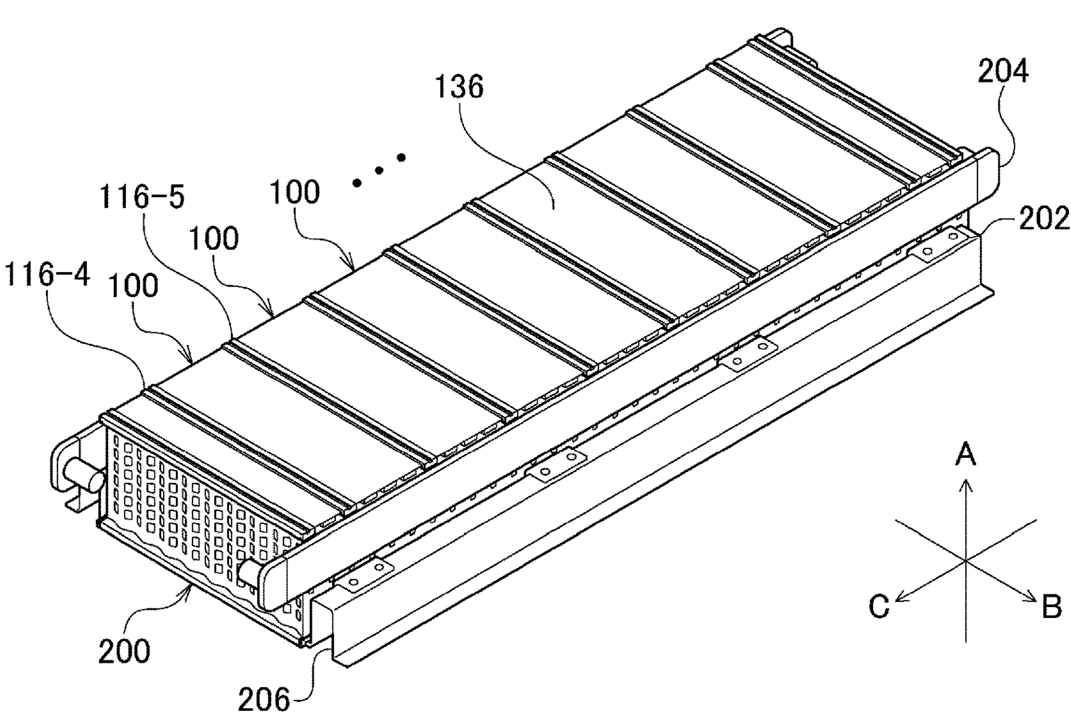
FIG. 9A is a perspective view of a power storage module group.
Figure 9B:
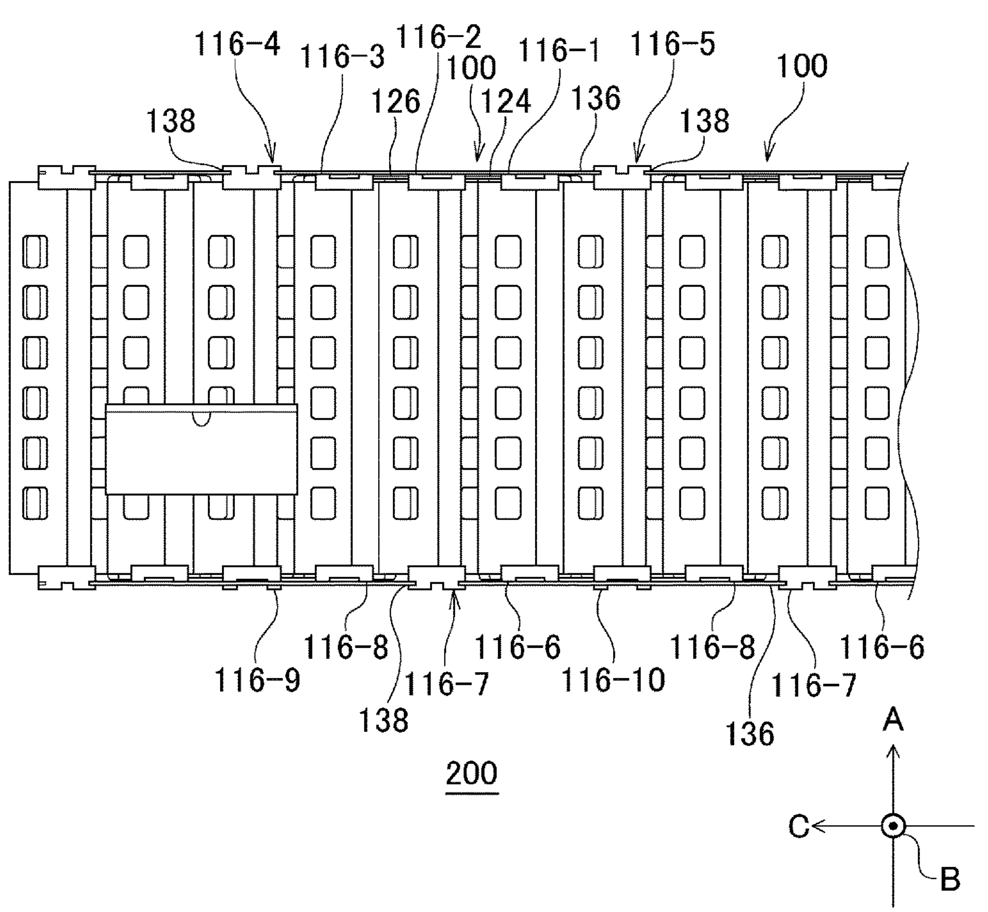
FIG. 9B is a side view of a part of the power storage module group.

FIG. 9A is a perspective view of power storage module group 200. FIG. 9B is a side view of a part of power storage module group 200. For example, a plurality of power storage modules 100 of the present exemplary embodiment are arranged in orthogonal direction C to constitute power storage module group 200. In power storage module group 200, two adjacent power storage modules 100 are connected in series by, for example, above-described ladder-shaped bus bar 132. That is, two adjacent power storage modules 100 are disposed such that first power storage device 1-1 of one of power storage modules 100 and fourth power storage device 1-4 of the other of power storage modules 100 are adjacent to each other. First power storage device 1-1 and second power storage device 1-2 of one of power storage modules 100 and third power storage device 1-3 and fourth power storage device 1-4 of the other of power storage modules 100 are connected in series by ladder-shaped bus bar 132.

Note that in two adjacent power storage modules 100, end holder 110 of one of power storage modules 100 is replaced with fourth holder 102-4 of the other of power storage modules 100. Furthermore, fifth reinforcement part 116-5 of one of power storage modules 100 and fourth reinforcement part 116-4 of the other of power storage modules 100 are formed in common. Furthermore, tenth reinforcement part 116-10 of one of power storage modules 100 and ninth reinforcement part 116-9 of the other of power storage modules 100 are formed in common. Furthermore, as described above, in a case where two power storage modules 100 are connected in series by ladder-shaped bus bars 132, sixth reinforcement part 116-6 of one of power storage modules 100 is replaced with first reinforcement part 116-1. Furthermore, tenth reinforcement part 116-10 (the other ninth reinforcement part 116-9) of one of power storage modules 100 is replaced with second reinforcement part 116-2. Furthermore, ninth reinforcement part 116-9 of the other of power storage modules 100 is replaced with third reinforcement part 116-3.

In power storage module group 200 as an example, fixing tools 202 are provided on both sides in arrangement direction B. Furthermore, a position of power storage module group 200 is regulated by a pair of positioning members 204 extending in orthogonal direction C on both sides in arrangement direction B. In this state, power storage module group 200 is mounted on fixed seat 206 provided on a mounting target such as a vehicle body. In a state where power storage module group 200 is placed on fixed seat 206, fixing tool 202 and fixed seat 206 overlap each other. Fixing tool 202 and fixed seat 206 are connected to each other by a fastening member such as a screw.

Furthermore, each power storage module 100 includes cover plate 136. Cover plate 136 covers the plurality of power storage devices 1 in alignment with the plurality of power storage devices 1 in axial direction A. In the present exemplary embodiment, cover plates 136 are disposed on both sides of each power storage module 100 in axial direction A. Furthermore, reinforcement member 114 includes plate support groove 138 into which cover plate 136 is fitted (see also FIG. 7). That is, reinforcement member 114 also serves as a support mechanism of cover plate 136.

For example, fourth reinforcement part 116-4, fifth reinforcement part 116-5, and seventh reinforcement part 116-7 include plate support groove 138. Cover plate 136 disposed on the same side as first reinforcement part 116-1 to fifth reinforcement part 116-5 in axial direction A is supported by fourth reinforcement part 116-4 and fifth reinforcement part 116-5 of one power storage module 100. Furthermore, cover plate 136 disposed on the same side as sixth reinforcement part 116-6 to tenth reinforcement part 116-10 in axial direction A is supported by seventh reinforcement parts 116-7 of two adjacent power storage modules 100. Note that some of the reinforcement parts (seventh reinforcement part 116-7 in the present exemplary embodiment) which opposedly face fixed seat 206 also function as leg parts which are brought into contact with fixed seat 206 to support respective power storage modules 100.

To be more specific, fourth reinforcement part 116-4 and fifth reinforcement part 116-5 protrude outward of power storage module 100 in axial direction A more than first reinforcement part 116-1 to third reinforcement part 116-3. Plate support grooves 138 extending in arrangement direction B are provided on side surfaces of fourth reinforcement part 116-4 and fifth reinforcement part 116-5 facing orthogonal direction C. Plate support groove 138 provided in fourth reinforcement part 116-4 and plate support groove 138 provided in fifth reinforcement part 116-5 face each other in orthogonal direction C. Cover plate 136 is inserted between fourth reinforcement part 116-4 and fifth reinforcement part 116-5, and both ends thereof are supported by plate support grooves 138 facing each other.

Furthermore, seventh reinforcement part 116-7 protrudes in axial direction A more than sixth reinforcement part 116-6 and eighth reinforcement part 116-8 to tenth reinforcement part 116-10. Then, plate support groove 138 extending in arrangement direction B is provided on a side surface of seventh reinforcement part 116-7 facing orthogonal direction C. Plate support grooves 138 provided in seventh reinforcement parts 116-7 of two adjacent power storage modules 100 face each other in orthogonal direction C. Cover plate 136 is inserted between two seventh reinforcement parts 116-7, and both ends thereof are supported by plate support grooves 138 facing each other. Note that, in a case where power storage module 100 is used alone, for example, plate support groove 138 may be formed in ninth reinforcement part 116-9 and tenth reinforcement part 116-10, and cover plate 136 may be supported by ninth reinforcement part 116-9 and tenth reinforcement part 116-10.

As described above, power storage module 100 according to the present exemplary embodiment includes the plurality of power storage devices 1, the plurality of holders 102 that hold the plurality of power storage devices 1, and the reinforcement members 114 for the plurality of holders 102. The plurality of power storage devices 1 include first power storage device 1-1 and second power storage device 1-2. Each of first power storage device 1-1 and second power storage device 1-2 includes a plurality of cylindrical electrode assemblies 2, and film outer covering body 4 including a plurality of containers 12 individually enclosing the plurality of electrode assemblies 2 and sealing parts 14 that seal containers 12 and connect the plurality of containers 12 to each other, and first power storage device 1-1 and second power storage device 1-2 are arranged in arrangement direction B of electrode assemblies 2 and orthogonal direction C orthogonal to axial direction A of electrode assemblies 2.

The plurality of holders 102 includes first holder 102-1 and second holder 102-2. First holder 102-1 includes first side plate 106-1 extending in arrangement direction B. First side plate 106-1 includes a plurality of recesses **106*a* into which respective containers 12 of first power storage device 1-1 are fitted. Second holder 102-2 includes second side plate 106-2 extending in arrangement direction B. Second side plate 106-2 includes the plurality of recesses 106*a* into which respective containers 12 of second power storage device 1-2** are fitted.

Reinforcement member 114 includes first reinforcement part 116-1, second reinforcement part 116-2, and first connection part 124. First reinforcement part 116-1 includes side plate grooves 120 that extend in arrangement direction B, are aligned with first side plate 106-1 in axial direction A, and into which first side plate 106-1 is fitted on a surface facing first side plate 106-1. Second reinforcement part 116-2 includes side plate grooves 120 that extend in arrangement direction B, are aligned with second side plate 106-2 in axial direction A, and into which second side plate 106-2 is fitted on a surface facing second side plate 106-2. First connection part 124 connects first reinforcement part 116-1 and second reinforcement part 116-2, and is at least temporarily slidable with respect to at least one of first reinforcement part 116-1 and second reinforcement part 116-2.

Power storage device 1 is long in arrangement direction B, and film outer covering body 4 has high flexibility. Thus, when power storage device 1 receives an impact or the like from the outside, power storage device 1 is likely to bend such that a center in arrangement direction B protrudes in orthogonal direction C with respect to both ends. Furthermore, since power storage device 1 is long in arrangement direction B, side plate 106 is also long in arrangement direction B. Furthermore, from the viewpoint of the weight reduction of power storage module 100 and the like, a thickness of side plate 106 is required to be as thin as possible. Therefore, similarly to power storage device 1, side plate 106 is also likely to bend such that a center in arrangement direction B protrudes in orthogonal direction C. In particular, side plate 106 includes the plurality of recesses **106*a*** arranged in arrangement direction B, and thus is more likely to bend.

On the other hand, by fitting first reinforcement part 116-1 into an end of first side plate 106-1, the rigidity of first holder 102-1 against the above-described bending can be enhanced. Furthermore, by fitting second reinforcement part 116-2 into an end of second side plate 106-2, the rigidity of second holder 102-2 against the above-described bending can be enhanced. Therefore, the holding strength of first power storage device 1-1 and second power storage device 1-2 can be increased. Furthermore, stress generated in first holder 102-1 and second holder 102-2 can be effectively reduced, and rigidity of power storage module 100 can be enhanced. Furthermore, as compared with a case where a thickness of side plate 106 is increased to obtain equivalent rigidity, it is possible to suppress an increase in weight of power storage module 100. Therefore, it is possible to easily achieve both increased rigidity and reduced weight of power storage module 100.

Furthermore, first reinforcement part 116-1 and second reinforcement part 116-2 are connected to each other by first connection part 124. As a result, the relative displacement between first reinforcement part 116-1 and second reinforcement part 116-2 can be restricted. As a result, the holding strength of first power storage device 1-1 and second power storage device 1-2 can be further enhanced. Furthermore, rigidity of power storage module 100 can be further enhanced.

Each of electrode assemblies 2 varies in size and shape. Accordingly, when the plurality of device units 104 are connected to each other, if the device units 104 are packed such that the intervals between adjacent side plates 106 are equalized, a part of electrode assemblies 2 may be excessively compressed. When an excessive load is applied to electrode assemblies 2, power generation performance of power storage device 1 may be deteriorated. Therefore, in order to prevent an excessive load from being applied to each of electrode assemblies 2, for example, it is desirable to pack each device unit 104 such that the maximum value of a pressure applied to electrode assemblies 2 becomes constant between respective power storage devices 1. However, in this case, an interval between adjacent side plates 106 becomes not constant.

On the other hand, first connection part 124 of the present exemplary embodiment is at least temporarily slidable with respect to at least one of first reinforcement part 116-1 and second reinforcement part 116-2. As a result, the interval between first reinforcement part 116-1 and second reinforcement part 116-2 can be flexibly changed according to an interval between first side plate 106-1 and second side plate 106-2. That is, the variation (tolerance) in a distance between adjacent side plates 106 can be absorbed by the sliding of first connection part 124. Therefore, the holding strength of each power storage device 1 can be enhanced while suppressing application of an excessive load to electrode assemblies 2.

Furthermore, side plate 106 includes the plurality of recesses 112*a*, and respective containers 12 of power storage device 1 are fitted into respective recesses 112*a*. Accordingly, power storage device 1 can be more stably held. Accordingly, the electrical connection state between each power storage device 1 and bus bar 132 can be more stably held, and the breakage and the like of each power storage device 1 can be further suppressed. Therefore, power generation performance and safety performance of power storage module 100 can be enhanced. Furthermore, since power storage device 1 has a pouch structure in which the plurality of electrode assemblies 2 are sealed by the film outer covering body 4, it is possible to reduce the weight of power storage module 100 as compared with the case where electrode assemblies 2 are individually sealed by an outer covering can.

Furthermore, reinforcement member 114 of the present exemplary embodiment includes the plurality of first connection parts 124 arranged in arrangement direction B. As a result, the relative displacement between first reinforcement part 116-1 and second reinforcement part 116-2 can be further restricted. Therefore, the holding strength of first power storage device 1-1 and second power storage device 1-2 can be further enhanced. Furthermore, rigidity of power storage module 100 can be further enhanced.

Furthermore, first connection part 124 of the present exemplary embodiment is configured of a part of a member constituting second reinforcement part 116-2. First connection part 124 extends from second reinforcement part 116-2 toward first reinforcement part 116-1 and is connected to first reinforcement part 116-1 so as to be slidable at least temporarily. As described above, by integrally molding first connection part 124 with second reinforcement part 116-2, the rigidity of the assembly of first reinforcement part 116-1, second reinforcement part 116-2, and first connection part 124 can be enhanced. Therefore, the holding strength of first power storage device 1-1 and second power storage device 1-2 can be further enhanced, and the rigidity of power storage module 100 can be further enhanced. Furthermore, it is possible to suppress an increase in the number of components due to the provision of first connection part 124.

Furthermore, power storage device 1 of the present exemplary embodiment includes third power storage device 1-3. First power storage device 1-1, second power storage device 1-2, and third power storage device 1-3 are arranged in this order in orthogonal direction C. Furthermore, holders 102 includes third holder 102-3. Third holder 102-3 includes third side plate 106-3 extending in arrangement direction B. Third side plate 106-3 includes the plurality of recesses 106*a* into which respective containers 12 of third power storage device 1-3 are fitted. Reinforcement member 114 includes third reinforcement part 116-3 and second connection part 126. Third reinforcement part 116-3 includes side plate grooves 120 that extend in arrangement direction B, are aligned with third side plate 106-3 in axial direction A, and into which third side plate 106-3 is fitted on a surface facing third side plate 106-3. Second connection part 126 connects second reinforcement part 116-2 and third reinforcement part 116-3, and is at least temporarily slidable with respect to at least one of second reinforcement part 116-2 and third reinforcement part 116-3.

By fitting third reinforcement part 116-3 into an end of third side plate 106-3, the rigidity of third holder 102-3 against the above-described bending can be enhanced. Therefore, the holding strength of third power storage device 1-3 can be enhanced. Furthermore, rigidity of power storage module 100 can be further enhanced. Furthermore, by connecting second reinforcement part 116-2 and third reinforcement part 116-3 by second connection part 126, the holding strength of second power storage device 1-2 and third power storage device 1-3 can be further enhanced. Furthermore, rigidity of power storage module 100 can be further enhanced. Moreover, by making second connection part 126 at least temporarily slidable with respect to at least one of second reinforcement part 116-2 and third reinforcement part 116-3, it is possible to enhance the holding strength of each power storage device 1 while suppressing application of an excessive load to electrode assemblies 2.

Furthermore, reinforcement member 114 of the present exemplary embodiment includes the plurality of second connection parts 126 arranged in arrangement direction B. As a result, the relative displacement between second reinforcement part 116-2 and third reinforcement part 116-3 can be further restricted. Therefore, the holding strength of second power storage device 1-2 and third power storage device 1-3 can be further enhanced. Furthermore, rigidity of power storage module 100 can be further enhanced.

Furthermore, second connection part 126 of the present exemplary embodiment is configured of a part of a member constituting second reinforcement part 116-2. Second connection part 126 extends from second reinforcement part 116-2 toward third reinforcement part 116-3 and is connected to third reinforcement part 116-3 so as to be slidable at least temporarily. As described above, by integrally molding second connection part 126 with second reinforcement part 116-2, the rigidity of the assembly of second reinforcement part 116-2, third reinforcement part 116-3, and second connection part 126 can be enhanced. Therefore, the holding strength of second power storage device 1-2 and third power storage device 1-3 can be further enhanced, and the rigidity of power storage module 100 can be further enhanced. Furthermore, it is possible to suppress an increase in the number of components due to the provision of second connection part 126.

Furthermore, power storage module 100 of the present exemplary embodiment includes bus bars 132 that electrically connect the plurality of electrode assemblies 2 to each other. Reinforcement member 114 has an insulating property and includes mounting part 134 for bus bars 132. Consequently, reinforcement member 114 can reinforce holders 102 and insulate bus bars 132. Therefore, it is possible to suppress an increase in the number of components of power storage module 100 by providing reinforcement member 114.

Furthermore, some bus bars 132 according to the present exemplary embodiment include first bus bar part 132*a*, second bus bar part 132*b*, and third bus bar part 132*c*. First bus bar part 132*a* extends in arrangement direction B, and the electrode lead of first power storage device 1-1 and the electrode lead of second power storage device 1-2 are connected to each other. Second bus bar part 132*b* extends in arrangement direction B, and is connected to the electrode lead of third power storage device 1-3. Third bus bar part 132*c* is connected to first bus bar part 132*a* and second bus bar part 132*b*. First reinforcement part 116-1 includes mounting part 134 for first bus bar part 132*a*, third reinforcement part 116-3 includes mounting part 134 for second bus bar part 132*b*, and first connection part 124, second reinforcement part 116-2, and second connection part 126 include mounting part 134 for third bus bar part 132*c*.

As described above, by using the aggregate of first reinforcement part 116-1 to third reinforcement part 116-3, first connection part 124, and second connection part 126 as an insulating plate that supports substantially ladder-shaped bus bars 132 having first bus bar part 132*a* to third bus bar part 132*c*, insulation of bus bars 132 can be efficiently realized.

Furthermore, first reinforcement part 116-1 of the present exemplary embodiment includes recess 128 in which a part of first connection part 124 is accommodated, and mounting part 134 of first reinforcement part 116-1 is configured of the recess. In axial direction A, the bottom surface of recess 128 is separated from bus bar 132 from the bottom surface of mounting part 134. Furthermore, third reinforcement part 116-3 of the present exemplary embodiment includes recess 130 in which a part of second connection part 126 is accommodated, and mounting part 134 of third reinforcement part 116-3 is configured of the recess. In axial direction A, the bottom surface of recess 130 is separated from bus bar 132 from the bottom surface of mounting part 134. With these configurations, the heights of the bottom surfaces of mounting parts 134 provided in first reinforcement part 116-1 to third reinforcement part 116-3 can be easily aligned.

Furthermore, power storage module 100 of the present exemplary embodiment includes cover plate 136 that is arranged side by side with the plurality of power storage devices 1 in axial direction A and covers the plurality of power storage devices 1. Reinforcement member 114 includes plate support groove 138 into which cover plate 136 is fitted. Thus, reinforcement member 114 can reinforce holders 102 and support cover plate 136. Therefore, it is possible to suppress an increase in the number of components of power storage module 100 by providing reinforcement member 114.

Furthermore, side plate 106 of the present exemplary embodiment has a corrugated plate shape repeating irregularities in arrangement direction B and is sandwiched between two power storage devices 1, and each container 12 of one of power storage devices 1 is fitted into each recess 106*a* when viewed from one main surface, and each container 12 of the other of power storage devices 1 is fitted into each protrusion 106*b* from a back surface when viewed from the main surface. Accordingly, the stability of each power storage device 1 in power storage module 100 can be further enhanced. Note that when at least one of side plates 106 included in power storage module 100 has a corrugated shape, the stability of power storage device 1 can be considerably improved. Furthermore, the weight of holder 102 can be reduced by forming side plate 106 in a corrugated shape.

Furthermore, film outer covering body 4 of the present exemplary embodiment is refracted or curved between adjacent containers 12 and meanders in arrangement direction B. Accordingly, the length of power storage device 1 can be shortened as compared with the case where film outer covering body 4 is not folded without reducing the size of sealing part 14. As a result, the number of electrode assemblies 2 mounted on power storage module 100 can be increased, and power storage module 100 can be downsized without reducing the number of electrode assemblies 2 mounted on the power storage module. That is, according to the present exemplary embodiment, it is possible to improve energy density of power storage module 100 while a decrease in sealing property of electrode assemblies 2 is suppressed.

The exemplary embodiment of the present disclosure has been described in detail above. The above-described exemplary embodiment is merely a specific example for implementing the present disclosure. The contents of the exemplary embodiment do not limit the technical scope of the present disclosure, and many design changes such as changes, additions, and deletions of constituent elements can be made without departing from the spirit of the invention defined in the claims. Any new exemplary embodiment resulting from a change or modification according to the designed concept offers effects of an exemplary embodiment and a modification that are combined with the new exemplary embodiment. In the above-described exemplary embodiment, what can be changed or modified according to the designed concept is emphasized by such phrases as "of the present exemplary embodiment" and "in the present exemplary embodiment". However, contents not expressed by such phrases may also be changed or modified according to the designed concept. Furthermore, any combination of constituent elements included in each exemplary embodiment is also effective as an aspect of the present disclosure. Hatching applied to the cross section in the drawing does not limit the material of the object to which the hatching has been applied.

REFERENCE MARKS IN THE DRAWINGS

1 power storage device
1-1 first power storage device
1-2 second power storage device
1-3 third power storage device
2 electrode assembly
4 film outer covering body

12 container
14 sealing part
100 power storage module
102 holder
102-1 first holder
102-2 second holder
102-3 third holder
106 side plate
**106*a*** recess
**106*b*** protrusion
106-1 first side plate
106-2 second side plate
106-3 third side plate
114 reinforcement member
116-1 first reinforcement part
116-2 second reinforcement part
116-3 third reinforcement part
120 side plate groove
124 first connection part
126 second connection part
132 bus bar
**132*a*** first bus bar part
**132*b*** second bus bar part
**132*c*** third bus bar part
134 mounting part
136 cover plate
138 plate support groove

The invention claimed is:

1. A power storage module comprising:
a plurality of power storage devices;
a plurality of holders that hold the plurality of power storage devices; and
a reinforcement member for the plurality of holders, wherein
the plurality of power storage devices include a first power storage device and a second power storage device,
each of the first power storage device and the second power storage device includes
a plurality of cylindrical electrode assemblies, and
a film outer covering body including
a plurality of containers individually enclosing the plurality of cylindrical electrode assemblies and
a sealing part sealing each of the plurality of containers and connecting the plurality of containers to each other,
the first power storage device and the second power storage device are arranged in an orthogonal direction orthogonal to an arrangement direction of the plurality of cylindrical electrode assemblies and an axial direction of the plurality of cylindrical electrode assemblies,
the plurality of holders includes a first holder and a second holder,
the first holder includes a first side plate elongated in the arrangement direction and including a plurality of recesses, fitting each into corresponding one of the plurality of containers of the first power storage device,
the second holder includes a second side plate elongated in the arrangement direction and including a plurality of recesses fitting each into corresponding one of the plurality of containers of the second power storage device,
the reinforcement member includes a first reinforcement part, a second reinforcement part, and a first connection part,
the first reinforcement part includes a side plate groove that elongated in the arrangement direction, is aligned with the first side plate in the axial direction, and into which the first side plate is fitted on a surface facing the first side plate,
the second reinforcement part includes a side plate groove that elongated in the arrangement direction, is aligned with the second side plate in the axial direction, and into which the second side plate is fitted on a surface facing the second side plate, and
the first connection part connects the first reinforcement part and the second reinforcement part, and is at least temporarily slidable with respect to at least one of the first reinforcement part and the second reinforcement part.

2. The power storage module according to claim 1, wherein the first connection part is configured of a part of a member constituting the second reinforcement part, is elongated from the second reinforcement part toward the first reinforcement part, and is connected to the first reinforcement part at least temporarily slidably.

3. The power storage module according to claim 2, wherein
the first reinforcement part includes a recess in which a part of the first connection part is accommodated, and
a gap is provided between the recess and the part of the first connection part in at least one of the orthogonal direction and the arrangement direction.

4. The power storage module according to claim 1, wherein
the plurality of power storage devices include a third power storage device,
the first power storage device, the second power storage device, and the third power storage device are arranged in this order in the orthogonal direction,
the plurality of holders include a third holder,
the third holder includes a third side plate elongated in the arrangement direction and including a plurality of recesses fitting each into corresponding one of containers of the third power storage device,
the reinforcement member includes a third reinforcement part and a second connection part,
the third reinforcement part includes a side plate groove that is elongated in the arrangement direction, is aligned with the third side plate in the axial direction, and into which the third side plate is fitted on a surface facing the third side plate, and
the second connection part connects the second reinforcement part and the third reinforcement part, and is at least temporarily slidable with respect to at least one of the second reinforcement part and the third reinforcement part.

5. The power storage module according to claim 4, wherein the second connection part is configured of a part of a member constituting the second reinforcement part, is elongated from the second reinforcement part toward the third reinforcement part, and is connected to the third reinforcement part at least temporarily slidably.

6. The power storage module according to claim 5, wherein
the third reinforcement part includes a recess in which a part of the second connection part is accommodated, and
a gap is provided between the recess and the part of the second connection part in at least one of the orthogonal direction and the arrangement direction.

7. The power storage module according to claim 1, further comprising a bus bar that electrically connects the plurality of cylindrical electrode assemblies to each other, wherein the reinforcement member is provided with an insulating property and includes a mounting part of the bus bar on a surface facing opposite to the plurality of holders.

8. The power storage module according to claim 1, further comprising a bus bar that electrically connects the plurality of cylindrical electrode assemblies to each other, wherein the first power storage device, the second power storage device, and the third power storage device each include an electrode lead electrically connected to corresponding one of the plurality of cylindrical electrode assemblies, the bus bar includes a first bus bar elongated in the arrangement direction and to which the electrode lead of the first power storage device and the electrode lead of the second power storage device are connected, a second bus bar elongated in the arrangement direction and to which the electrode lead of the third power storage device is connected, and a third bus bar connected to the first bus bar and the second bus bar, the first reinforcement part is provided with an insulating property and includes a mounting part for the first bus bar, the third reinforcement part is provided with an insulating property and includes a mounting part for the second bus bar, and the first connection part, the second reinforcement part, and the second connection part are provided with an insulating property and include a mounting part for the third bus bar.

9. The power storage module according to claim 8, wherein the first reinforcement part includes a recess in which a part of the first connection part is accommodated, the mounting part included in the first reinforcement part is configured of a recess, and a bottom surface of the recess in which the part of the first connection part is accommodated is separated from the bus bar from a bottom surface of the mounting part included in the first reinforcement part in the axial direction.

10. The power storage module according to claim 8, wherein the third reinforcement part includes a recess in which a part of the second connection part is accommodated, the mounting part included in the third reinforcement part is configured of a recess, and a bottom surface of the recess in which the part of the second connection part is accommodated is separated from the bus bar from a bottom surface of the mounting part included in the third reinforcement part in the axial direction.

11. The power storage module according to claim 1, further comprising a cover plate that is arranged side by side with the plurality of power storage devices in the axial direction and covers the plurality of power storage devices, wherein the reinforcement member includes a plate support groove into which the cover plate is fitted.

12. The power storage module according to claim 1, wherein at least one of the first side plate and the second side plate has a corrugated shape in which the plurality of recesses and a plurality of protrusions are alternately provided in the arrangement direction and is sandwiched between two of the power storage devices, and each of the plurality of containers of one of the plurality of power storage devices is fitted into a corresponding one of the plurality of recesses when viewed from one main surface, and each of the plurality of containers of another of the plurality of power storage devices is fitted into a corresponding one of the plurality of protrusions from a back surface when viewed from the one main surface.

13. The power storage module according to claim 1, wherein the film outer covering body is bent or curved between a pair of containers adjacent to each other among the containers and meanders in the arrangement direction.

* * * * *